(12) United States Patent
Jung

(10) Patent No.: US 11,397,671 B2
(45) Date of Patent: *Jul. 26, 2022

(54) MEMORY SYSTEM

(71) Applicant: SK hynix Inc., Gyeonggi-do (KR)

(72) Inventor: Byung-Soo Jung, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 16 days.

This patent is subject to a terminal disclaimer.

(21) Appl. No.: 16/865,588

(22) Filed: May 4, 2020

(65) Prior Publication Data
US 2020/0264975 A1    Aug. 20, 2020

Related U.S. Application Data

(62) Division of application No. 15/787,821, filed on Oct. 19, 2017, now Pat. No. 10,671,523.

(30) Foreign Application Priority Data

Mar. 17, 2017 (KR) .......................... 10-2017-0033544

(51) Int. Cl.
*G06F 12/02* (2006.01)
*G06F 3/06* (2006.01)
*G06F 13/42* (2006.01)

(52) U.S. Cl.
CPC .......... *G06F 12/0246* (2013.01); *G06F 3/064* (2013.01); *G06F 3/065* (2013.01); *G06F 3/0619* (2013.01); *G06F 3/0679* (2013.01); *G06F 13/4282* (2013.01); *G06F 2212/7201* (2013.01); *G06F 2212/7202* (2013.01); *G06F 2212/7204* (2013.01)

(58) Field of Classification Search
None
See application file for complete search history.

(56) References Cited

U.S. PATENT DOCUMENTS

| | | | | |
|---|---|---|---|---|
| 9,563,552 | B2 * | 2/2017 | Tamura | G11C 29/44 |
| 2010/0146239 | A1 * | 6/2010 | Gabai | G11C 29/76 |
| | | | | 711/202 |
| 2013/0151767 | A1 * | 6/2013 | Berke | G06F 11/167 |
| | | | | 711/105 |
| 2015/0364218 | A1 * | 12/2015 | Frayer | G06F 12/0246 |
| | | | | 714/6.13 |

* cited by examiner

*Primary Examiner* — Stephanie Wu
(74) *Attorney, Agent, or Firm* — IP & T Group LLP

(57) ABSTRACT

A memory system include: a plurality of first memory devices each coupled to a first channel and including a plurality of first memory blocks; a plurality of second memory devices each coupled to a second channel and including a plurality of second memory blocks; a first access controller suitable for controlling an access to the first memory blocks; a second access controller suitable for controlling an access to the second memory blocks; and a bad block controller suitable for: selecting one between the first and second access controllers by comparing bad physical addresses corresponding to bad blocks included in each of the first and second memory devices with first and second physical addresses respectively corresponding to the first and second memory blocks, and transferring one of the first and second physical addresses and substitute physical address that replace the bad physical addresses.

3 Claims, 14 Drawing Sheets

MEMORY SYSTEM

CROSS-REFERENCE TO RELATED APPLICATIONS

This application is a division of U.S. patent application Ser. No. 15/787,821 filed on Oct. 19, 2017, which claims benefits of priority of Korean Patent Application No. 10-2017-0033544 filed on Mar. 17, 2017. The disclosure of each of the foregoing application is incorporated herein by reference in its entirety.

BACKGROUND

1. Field

Exemplary embodiments of the present invention relate to a memory system including a plurality of memory devices.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments of the present invention are directed to a memory system capable of efficiently managing bad memory blocks.

In accordance with an embodiment of the present invention, a memory system may include: a plurality of first memory devices each coupled to a first channel and including a plurality of first memory blocks; a plurality of second memory devices each coupled to a second channel and including a plurality of second memory blocks; a first access controller suitable for controlling an access to the first memory blocks; a second access controller suitable for controlling an access to the second memory blocks; and a bad block controller suitable for: selecting one between the first and second access controllers by comparing bad physical addresses corresponding to bad blocks included in each of the first and second memory devices with first and second physical addresses respectively corresponding to the first and second memory blocks, and transferring one of the first and second physical addresses and substitute physical address that replace the bad physical addresses.

The bad block controller may include: a first bad block table including mapping relation information between partial entries of the bad physical addresses with first substitute physical addresses corresponding to the first memory blocks; a second bad block table including mapping relation information between remaining partial entries of the bad physical addresses with second substitute physical addresses corresponding to the second memory blocks; and a path control element suitable for: selecting the first access controller and transferring the first substitute physical addresses when the first and second physical addresses are identical to the partial entries of the bad physical addresses; selecting the second access controller and transferring the second substitute physical addresses when the first and second physical addresses are identical to the remaining partial entries of the bad physical addresses; and selecting the first access controller and transferring the first physical addresses or selecting the second access controller and transferring the second physical addresses when the first and second physical addresses are not identical to the bad physical addresses.

The path control element may include: a first specific path control element suitable for: selecting the first access controller and transferring the first substitute physical addresses when the first physical address is identical to the partial entries of the bad physical addresses, selecting the second access controller and transferring the second substitute physical addresses when the first physical address is identical to the remaining partial entries of the bad physical addresses, and selecting the first access controller and transferring the first physical addresses when the first physical addresses is not identical to the bad physical addresses; and a second specific path control element suitable for selecting the second access controller and transferring the second substitute physical addresses when the second physical address is identical to the remaining partial entries of the bad physical addresses, selecting the first access controller and transferring the first substitute physical addresses when the second physical address is identical to the partial entries of the bad physical addresses, and selecting the second access controller and transferring the second physical addresses when the second physical addresses is not identical to the bad physical addresses.

The bad block controller may further include a bad information loading element suitable for: loading information of the bad physical addresses and the substitute physical addresses from the first and second memory devices, deciding which substitute physical addresses are to be mapped to the bad physical addresses based on the number of the loaded bad physical addresses, and generating the first and second bad block tables.

The bad information loading element may generate the first and second bad block tables by checking out the total number of the bad physical addresses that are stored in the first and second memory devices, and distributes the bad physical addresses in such a manner that the number of the partial entries of the bad physical addresses and the number of the remaining partial entries of the bad physical addresses do not exceed a predetermined number of difference.

In accordance with another embodiment of the present invention, a memory system may include: a plurality of first memory devices each coupled to a first way of a first channel and including a plurality of first memory blocks; a plurality of second memory devices each coupled to a second way of the first channel and including a plurality of second memory blocks; a plurality of third memory devices each coupled to a first way of a second channel and including a plurality of third memory blocks; a plurality of fourth memory devices each coupled to a second way of the second channel and including a plurality of fourth memory blocks; a first access controller suitable for controlling an access to the first memory blocks; a second access controller suitable for controlling an access to the second memory blocks; a third access controller suitable for controlling an access to the third memory blocks; a fourth access controller suitable for controlling an access to the fourth memory blocks; a first channel controller suitable for controlling an access to the first and second access controllers; a second channel controller suitable for controlling an access to the third and fourth access controllers; a first bad block controller suitable for: selecting one between the first and second access controllers by comparing first channel bad physical addresses corresponding to bad blocks included in each of the first and second memory devices with the first and second physical addresses respectively corresponding to the first and second memory blocks, and transferring one of the first and second physical addresses and substitute physical addresses that replace the first channel bad physical addresses; and a second bad block controller suitable for: selecting one between the third and fourth access controllers by comparing second channel bad physical addresses corresponding to bad blocks included in each of the third and fourth memory devices with the third and fourth physical addresses respectively corresponding to the third and fourth memory blocks, and transferring one of the third and fourth physical addresses and substitute physical addresses that replace the second channel bad physical addresses.

The first bad block controller may include: a first bad block table including mapping relation information between partial entries of the first bad physical addresses with first substitute physical addresses corresponding to the first memory blocks; a second bad block table including mapping relation information between partial entries of the second bad physical addresses with second substitute physical addresses corresponding to the second memory blocks; and a first path control element suitable for: selecting the first channel controller and the first access controller and transferring the first substitute physical addresses when the first and second physical addresses are identical to the first bad physical addresses, selecting the first channel controller and the second access controller and transferring the second substitute physical addresses when the first and second physical addresses are identical to the second bad physical addresses, and selecting the first channel controller and the first access controller and transferring the first physical addresses or selecting the first channel controller and the second access controller and transferring the second physical addresses when the first and second physical addresses are not identical to the first channel bad physical addresses.

The second bad block controller may include: a third bad block table including mapping relation information between partial entries of the third bad physical addresses with third substitute physical addresses corresponding to the third memory blocks; a fourth bad block table including mapping relation information between partial entries of the fourth bad physical addresses with fourth substitute physical addresses corresponding to the fourth memory blocks; and a second path control element suitable for: selecting the second channel controller and the third access controller and transferring the third substitute physical addresses when the third physical addresses and the fourth physical addresses are identical to the third bad physical addresses, selecting the second channel controller and the fourth access controller and transferring the fourth substitute physical addresses when the third and fourth physical addresses are identical to the fourth bad physical addresses, and selecting the second channel controller and the third access controller and transferring the third physical addresses or selecting the second channel controller and the fourth access controller and transferring the fourth physical addresses when the third and fourth physical addresses are not identical to the second channel bad physical addresses.

The first path control element may include: a first specific path control element suitable for: selecting the first channel controller and the first access controller and transferring the first substitute physical addresses when the first physical address is identical to the first bad physical addresses, selecting the first channel controller and the second access controller and transferring the second substitute physical addresses when the first physical address is identical to the second bad physical addresses, and selecting the first channel controller and the first access controller and transferring the first physical addresses when the first physical address is not identical to the first channel bad physical addresses; and a second specific path control element suitable for: selecting the first channel controller and the first access controller and transferring the first substitute physical addresses when the second physical address is identical to the first bad physical addresses, selecting the first channel controller and the second access controller and transferring the second substitute physical addresses when the second physical address is identical to the second bad physical addresses, and selecting the first channel controller and the second access controller and transferring the second physical addresses when the second physical address is not identical to the first channel bad physical addresses.

The second path control element may include: a third specific path control element suitable for: selecting the second channel controller and the third access controller and transferring the third substitute physical addresses when the third physical address is identical to the third bad physical addresses, selecting the second channel controller and the fourth access controller and transferring the fourth substitute physical addresses when the third physical address is identical to the fourth bad physical addresses, and selecting the second channel controller and the third access controller and transferring the third physical addresses when the third physical addresses are not identical to the second channel bad physical addresses; and a fourth specific path control element suitable for: selecting the second channel controller and the third access controller and transferring the third substitute physical addresses when the fourth physical address is identical to the third bad physical addresses; selecting the second channel controller and the fourth access controller and transferring the fourth substitute physical addresses when the fourth physical address is identical to the fourth bad physical addresses; and selecting the second channel controller and the fourth access controller and transferring the fourth physical addresses when the fourth physical address is not identical to the second channel bad physical addresses.

The first bad block controller may further include a first bad information loading element suitable for: loading information of the first channel bad physical addresses and the first and second substitute physical addresses from the first and second memory devices, deciding which of the first and second substitute physical addresses are to be mapped to the first channel bad physical addresses based on the number of the loaded first channel bad physical addresses, and generating the first and second bad block tables.

The first bad information loading element may generate the first and second bad block tables by checking out the total number of the first channel bad physical addresses that are stored in the first and second memory devices, and distributes the first channel bad physical addresses in such a manner that the number of the first bad physical addresses and the number of the second bad physical addresses do not exceed a predetermined number of difference.

The second bad block controller may further include a second bad information loading element suitable for: loading information of the second channel bad physical addresses and the third and fourth substitute physical addresses that are stored in the third and fourth memory devices, deciding which of the third and fourth substitute physical addresses are to be mapped to the second channel bad physical addresses based on the number of the loaded second channel bad physical addresses, and generating the third and fourth bad block tables.

The second bad information loading element may generate the third and fourth bad block tables by checking out the total number of the second channel bad physical addresses that are stored in the third and fourth memory devices, and distributes the second channel bad physical addresses in such a manner that the number of the third bad physical addresses and the number of the fourth bad physical addresses do not exceed a predetermined number of difference.

In accordance with yet another embodiment of the present invention, a memory system may include: a plurality of first memory devices each coupled to a first way of a first channel and including a plurality of first memory blocks; a plurality of second memory devices each coupled to a second way of the first channel and including a plurality of second memory blocks; a plurality of third memory devices each coupled to a first way of a second channel and including a plurality of third memory blocks; a plurality of fourth memory devices each coupled to a second way of the second channel and including a plurality of fourth memory blocks; a first access controller suitable for controlling an access to the first memory blocks; a second access controller suitable for controlling an access to the second memory blocks; a third access controller suitable for controlling an access to the third memory blocks; a fourth access controller suitable for controlling an access to the fourth memory blocks; a first channel controller suitable for controlling an access to the first and second access controllers; a second channel controller suitable for controlling an access to the third and fourth access controllers; a bad block controller suitable for; selecting one between the first and second channel controllers and then selecting one among the first to fourth second way controllers related to the selected one between the first and second controllers by comparing bad physical addresses corresponding to bad blocks included in each of the first to fourth memory devices with the first to fourth physical addresses, and transferring one of the first to fourth physical addresses and substitute physical addresses that replace the bad physical addresses.

The bad block controller may include: a first bad block table including mapping relation information between partial entries of the first bad physical addresses with first substitute physical addresses corresponding to the first memory blocks; a second bad block table including mapping relation information between partial entries of the second bad physical addresses with second substitute physical addresses corresponding to the second memory blocks; a third bad block table including mapping relation information between partial entries of the third bad physical addresses with third substitute physical addresses corresponding to the third memory blocks; a fourth bad block table including mapping relation information between partial entries of the fourth bad physical addresses with fourth substitute physical addresses corresponding to the fourth memory blocks; and a path control element suitable for: selecting the first channel controller and the first access controller and transferring the first substitute physical addresses when the first to fourth physical addresses are identical to the first bad physical addresses; selecting the first channel controller and the second access controller and transferring the second substitute physical addresses when the first to fourth physical addresses are identical to the second bad physical addresses; selecting the second channel controller and the third access controller and transferring the third substitute physical addresses when the first to fourth physical addresses are identical to the third bad physical addresses; selecting the second channel controller and the fourth access controller and transferring the fourth substitute physical addresses when the first to fourth physical addresses are identical to the fourth bad physical addresses; and selecting the first channel controller and the first access controller and transferring the first physical addresses, or selecting the first channel controller and the second access controller and transferring the second physical addresses, or selecting the second channel controller and the third access controller and transferring the third physical addresses, or selecting the second channel controller and the fourth access controller and transferring the fourth physical addresses when the first to fourth physical addresses are not identical to the bad physical addresses.

The path control element may include: a first specific path control element suitable for: selecting the first channel controller and the first access controller and transferring the first substitute physical addresses when the first physical address is identical to the first bad physical addresses, selecting the first channel controller and the second access controller and transferring the second substitute physical addresses when the first physical address is identical to the second bad physical addresses, selecting the second channel controller and the third access controller and transferring the third substitute physical addresses when the first physical address is identical to the third bad physical addresses, selecting the second channel controller and the fourth access controller and transferring the fourth substitute physical addresses when the first physical address is identical to the fourth bad physical addresses, and selecting the first channel controller and the first access controller and transferring the first physical addresses when the first physical address is not identical to the bad physical addresses; a second specific path control element suitable for: selecting the first channel controller and the first access controller and transferring the first substitute physical addresses when the second physical address is identical to the first bad physical addresses, selecting the first channel controller and the second access controller and transferring the second substitute physical addresses when the second physical address is identical to the second bad physical addresses, selecting the second channel controller and the third access controller and transferring the third substitute physical addresses when the second physical address is identical to the third bad physical addresses, selecting the second channel controller and the fourth access controller and transferring the fourth substitute physical addresses when the second physical address is identical to the fourth bad physical addresses, and selecting the first channel controller and the second access controller and transferring the second physical addresses when the second physical address is not identical to the bad physical addresses; a third specific path control element suitable for: selecting the first channel controller and the first access controller and transferring the first substitute physical addresses when the third physical address is identical to the first bad physical addresses, selecting the first channel controller and the second access controller and transferring the second substitute physical addresses when the third physical address is identical to the second bad physical addresses, selecting the second channel controller and the third access controller and transferring the third substitute physical addresses when the third physical address is identical to the third bad physical addresses, selecting the second channel controller and the fourth access controller and transferring the fourth substitute physical addresses when the third physical address is identical to the fourth bad physical addresses, and selecting the second channel controller and the third access controller and transferring the third physical addresses when the third physical address is not identical to the bad physical addresses; and a fourth specific path control element suitable for: selecting the first channel controller and the first access controller and transferring the first substitute physical addresses when the fourth physical address is identical to the first bad physical addresses, selecting the first channel controller and the second access controller and transferring the second substitute physical addresses when the fourth physical address is identical to the second bad physical addresses, selecting the second channel controller and the third access controller and transferring the third substitute physical addresses when the fourth physical address is identical to the third bad physical addresses, selecting the second channel controller and the fourth access controller and transferring the fourth substitute physical addresses when the fourth physical address is identical to the fourth bad physical addresses, and selecting the second channel controller and the fourth access controller and transferring the fourth physical addresses when the fourth physical address is not identical to the bad physical addresses.

The bad block controller may further include a bad information loading element suitable for: loading information of the bad physical addresses and the first to fourth substitute physical addresses from the first to fourth memory devices, deciding which of the first to fourth substitute physical addresses are to be mapped to the bad physical addresses based on the number of the loaded bad physical addresses, and generating the first to fourth bad block tables.

The bad information loading element may generate the first to fourth bad block tables by checking out the total number of the bad physical addresses that are stored in the first to fourth memory devices, and distributes the bad physical addresses in such a manner that the number of the first bad physical addresses, the number of the second bad physical addresses, the number of the third bad physical addresses, and the number of the fourth bad physical addresses do not exceed a predetermined number of difference.

DETAILED DESCRIPTION

Figure 1:
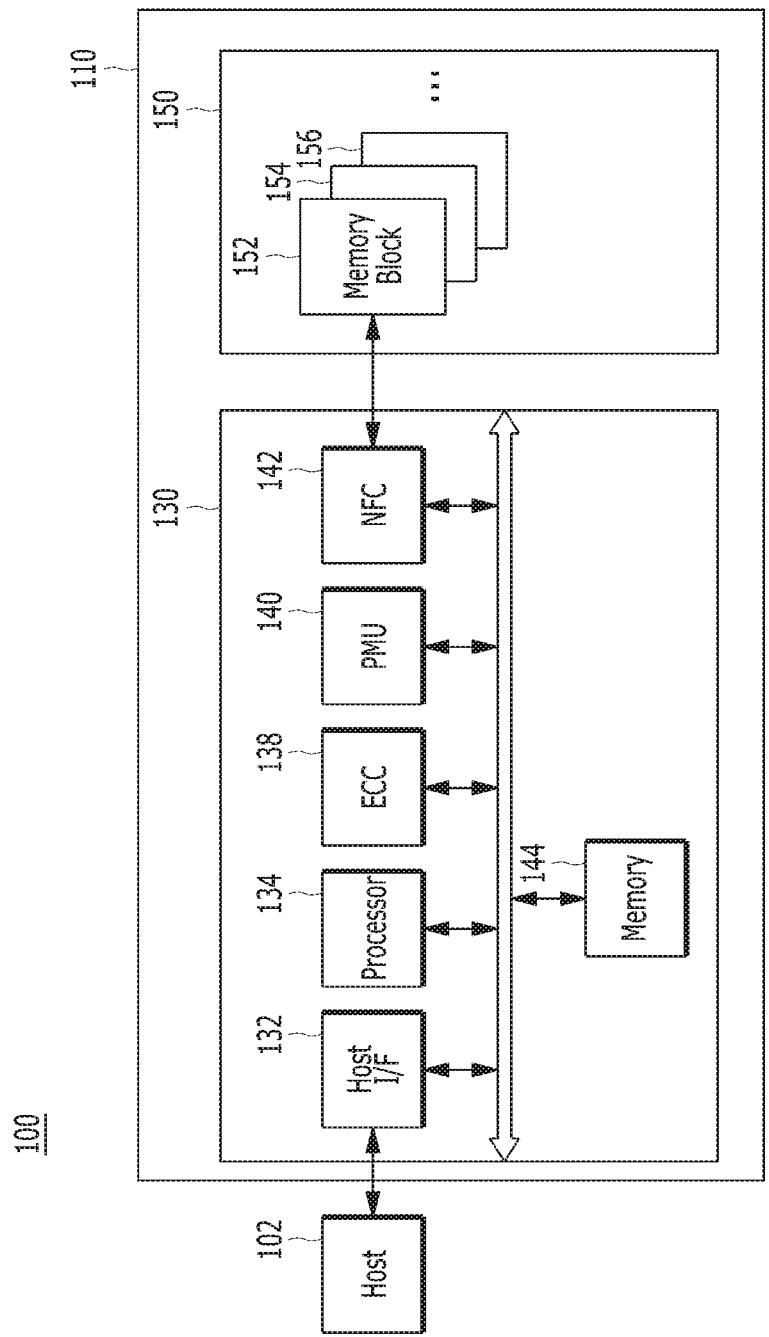
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include portable electronic devices such as a mobile phone, MP3 player and laptop computer or non-portable electronic devices such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and may execute an OS to perform an operation corresponding to a user's request on the memory system 110.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may include various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. In an embodiment, the memory system may employ one or more flash memories having a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In another example, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. In an embodiment, the memory device 150 may include a plurality of memory dies (not shown), each memory die may include a plurality of planes (not shown), each plane may include a plurality of memory blocks 152 to 156, each of the memory blocks 152 to 156 may include a plurality of pages, and each of the pages may include a plurality of memory cells coupled to a word line. In an embodiment, the memory device 150 may be a flash memory having a 3-dimensioanl (3D) stack structure.

The controller 130 may control the memory device 150 in response to a request from the host 102. More specifically, the controller may control a read, a write (also referred to as a program operation) and an erase operation of the memory device 150. For example, the controller 130 may provide data read from the memory device 150 to the host 102, and store data provided from the host 102 into the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
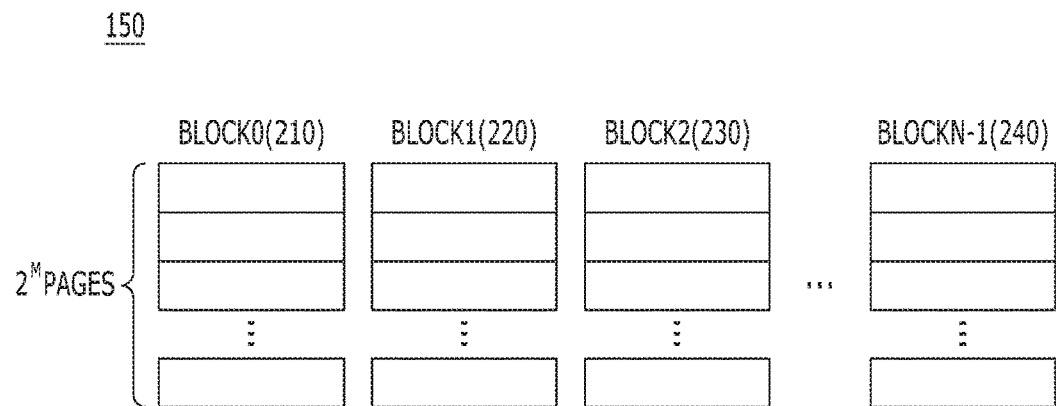
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be of a single level cell (SLC) storing 1-bit data, and/or a multi-level cell (MLC) storing 2- or more bit data. Hence, the memory device 150 may include SLC memory blocks or MLC memory blocks, depending on the number of bits which can be expressed or stored in each of the memory cells in the memory blocks. An SLC memory block may include a plurality of pages which are embodied by memory cells each storing one-bit data, and may generally have high data computing performance and high durability. An MLC memory block may include a plurality of pages which are embodied by memory cells each storing multi-bit data (for example, 2 or more bits), and may generally have a larger data storage space than the SLC memory block, that is, higher integration density. In an embodiment, the memory device 150 may include a plurality of Triple Level Cell (TLC) memory blocks. In yet another embodiment, the memory device 150 may include a plurality of Quadruple Level Cell (QLC) memory blocks. The TCL memory block may include a plurality of pages which are embodied by memory cells each capable of storing 3-bit data, the QLC memory block may include a plurality of pages which are embodied by memory cells each capable of storing 4-bit data.

Figure 3:
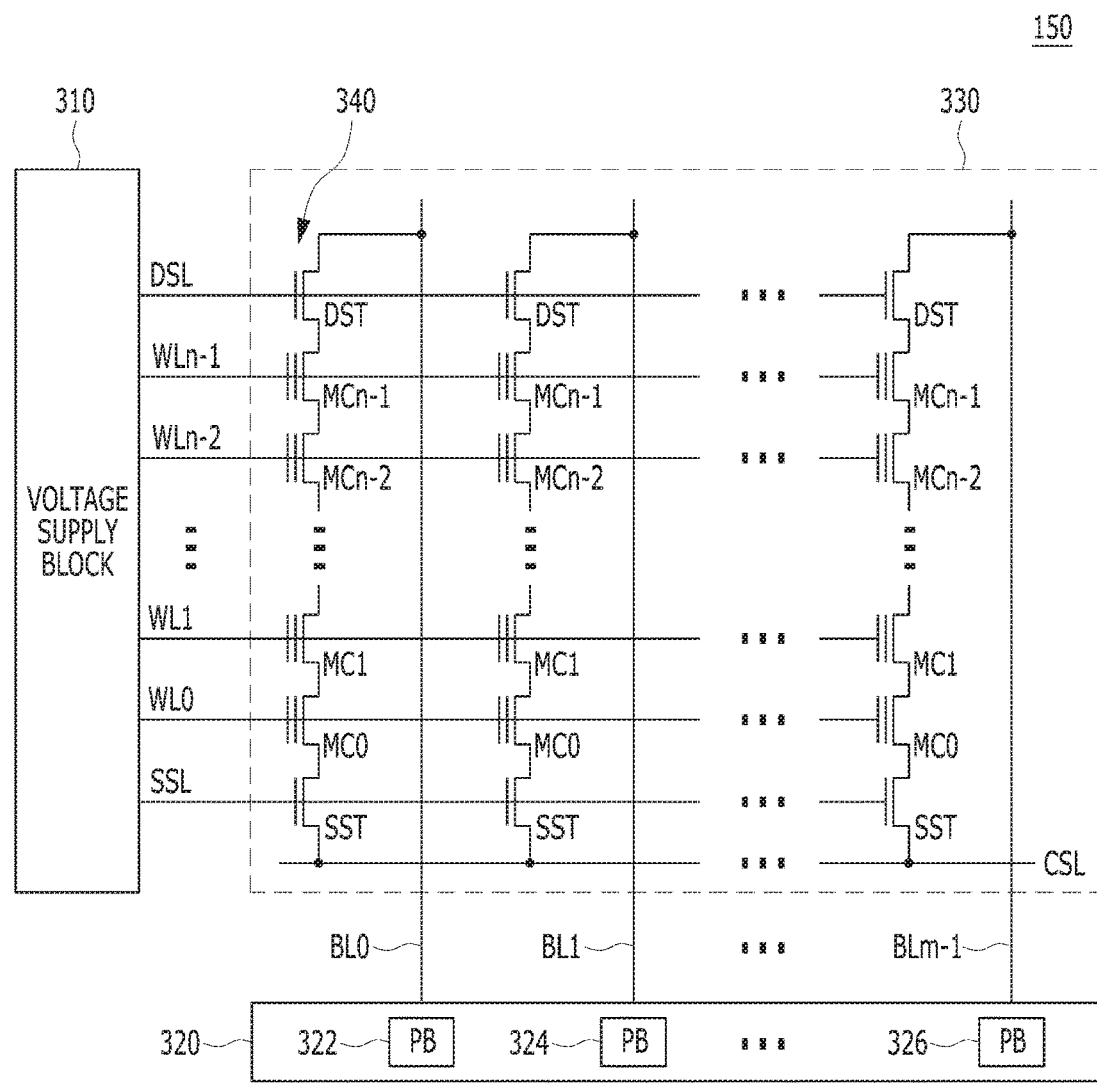
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
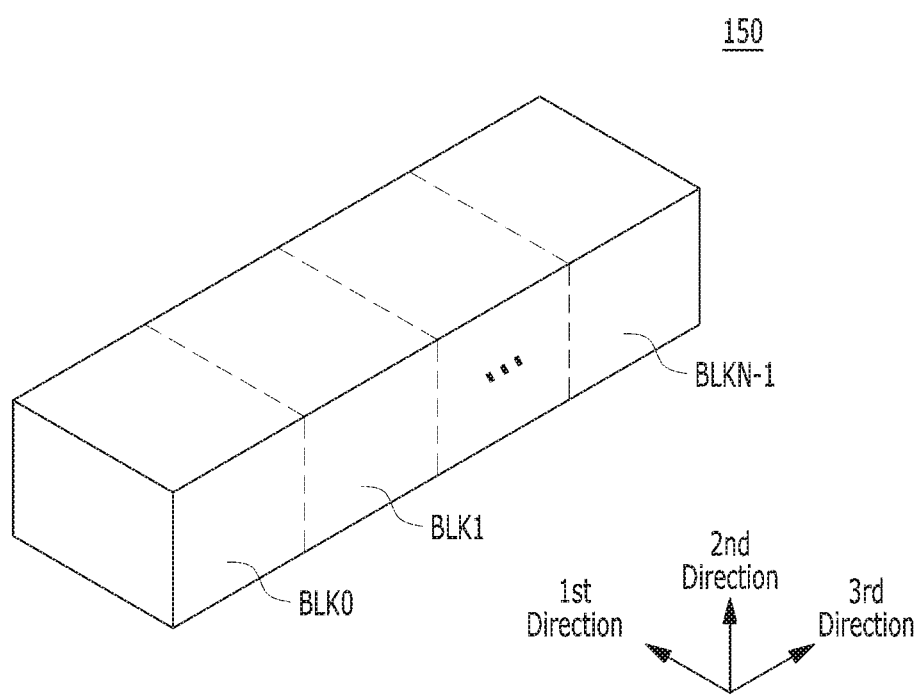
FIG. 4 is a schematic diagram illustrating an exemplary three-dimensional structure of the memory device shown in FIG. 2.

The memory device 150 may be embodied by a 2D or 3D memory device. FIG. 4 is a schematic diagram illustrating an exemplary 3D structure of the memory device 150.

Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5:
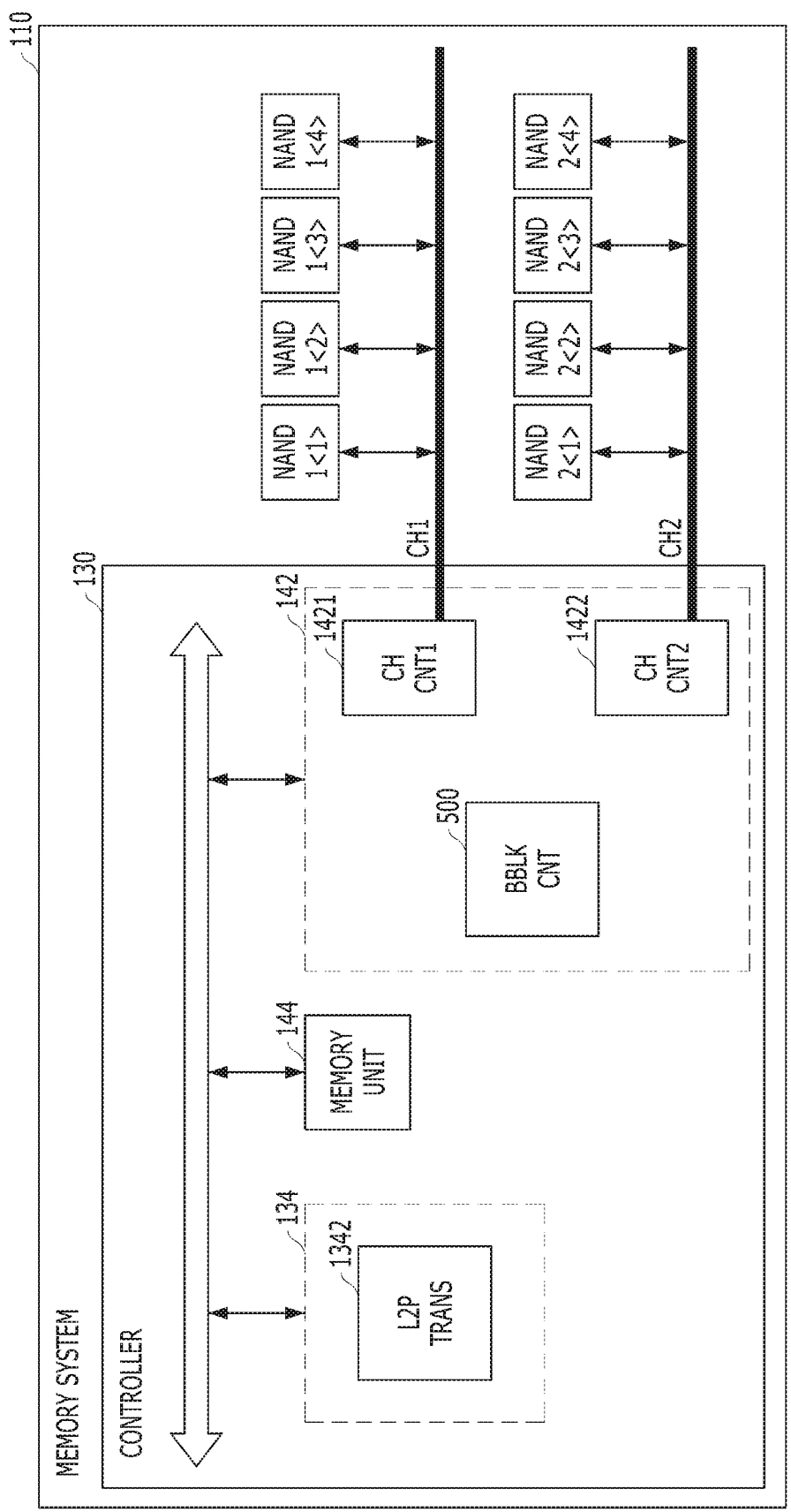
FIG. 5 is a block diagram illustrating a memory system in accordance with a first embodiment of the present invention.

FIG. 5 is a block diagram illustrating the memory system in accordance with a first embodiment of the present invention.

Figure 6:
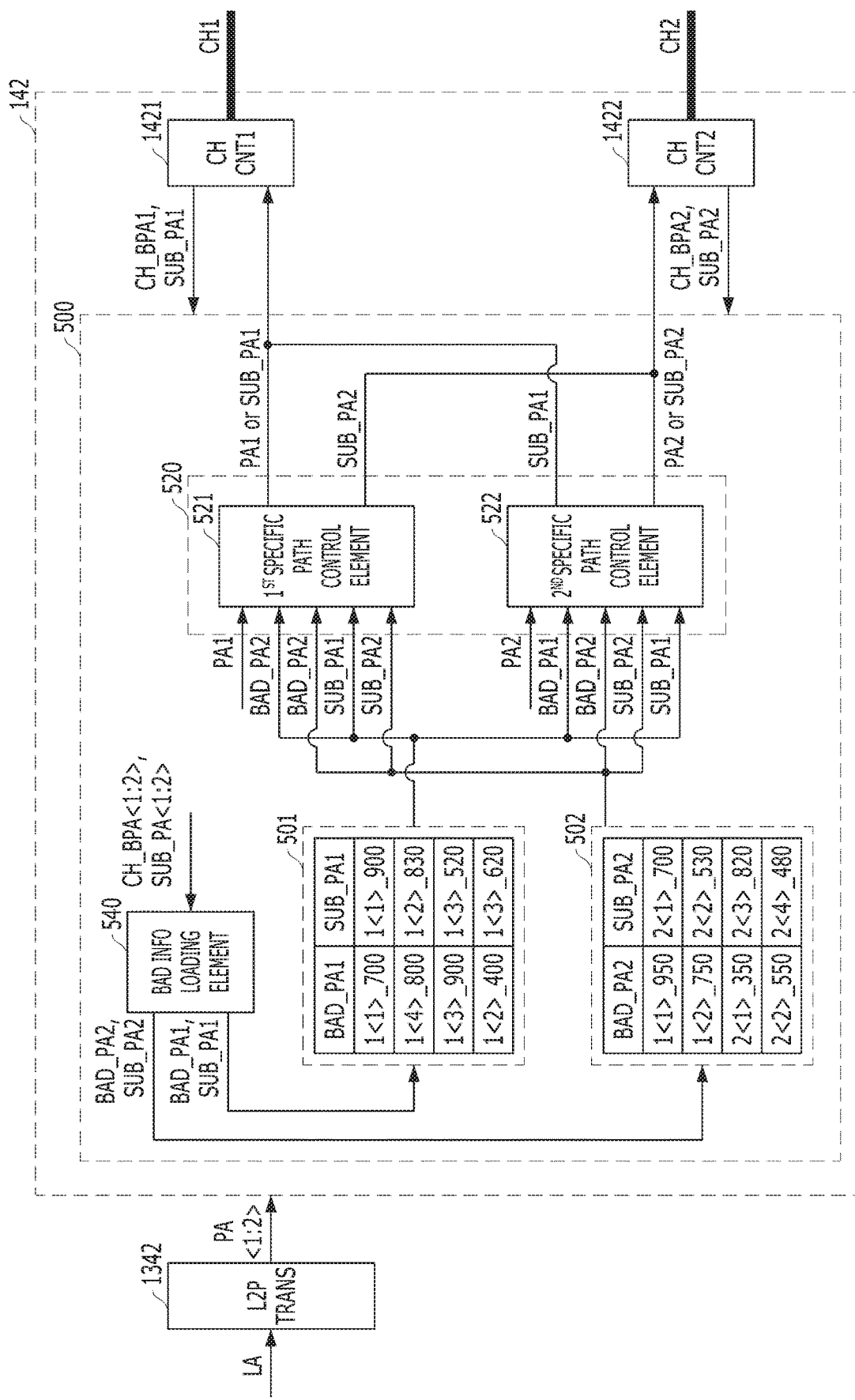
FIG. 6 is a block diagram illustrating an exemplary configuration of an NFC shown in FIG. 5.

FIG. 6 is a block diagram illustrating the NAND flash control unit (NFC) 142 shown in FIG. 5.

Referring to FIG. 5, the memory system 110 may include first and second memory devices NAND1<1:4> and NAND2<1:4> respectively corresponding to the memory device 150 of FIG. 1.

The first memory devices NAND1<1:4> may be coupled to a first channel CH1 and include a plurality of first memory blocks (not is shown), and the second memory devices NAND2<1:4> may be coupled to a second channel CH2 and include a plurality of second memory blocks (not shown). For the sake of convenience in description, the memory blocks included in the first memory devices NAND1<1:4> may be referred to as first memory blocks, and the memory blocks included in the second memory devices NAND2<1:4> may be referred to as second memory blocks in the first embodiment of the present invention.

The controller 130, as shown in FIG. 5, may include the processor 134, the memory unit 144, and the NAND flash control unit 142.

Herein, the processor 134 may control the general operation of the memory system 110 as described in FIG. 1. In particular, as illustrated in FIGS. 5 and 6, the processor 134 may include an address transformer 1342 which transforms the logical addresses LA of the first memory blocks that are included in each of the first memory devices NAND1<1:4> into first physical addresses and outputs the first physical addresses PA1, and transforms the logical addresses LA of the second memory blocks that are included in each of the second memory devices NAND2<1:4> into second physical addresses and outputs the second physical addresses PA2.

Also, the NAND flash control unit 142 may be a constituent element for controlling an operation of the memory devices NAND1<1:4> and NAND2<1:4>, which is also described in FIG. In particular, as illustrated in FIG. 5, the NFC 142 may include a first channel controller 1421 for controlling an access to the first memory devices NAND1<1:4>, a second channel controller 1422 for controlling an access to the second memory devices NAND2<1:4>, and a bad block controller 500 for integrating and managing bad memory blocks that are included in the first and second memory devices NAND1<1:4> and NAND2<1:4>.

Also, the memory unit 144 is a constituent element for storing data that are needed for an operation of the memory system 110, as described with reference to FIG. 1. In particular, the memory unit 144 is used to buffer data (i.e., store data temporarily) in the operations of the processor 134 and the NFC 142.

Herein, it is illustrated in FIG. 5 that a host interface (I/F) unit 132, an Error Correction Code (ECC) unit 138, and a power management unit 140 are not included in the controller 130, whereas the host interface unit 132, the ECC unit 138, and the power management unit 140 are illustrated to be included in the controller 130 in FIG. 1. However, this is for the sake of convenience in description, and actually, the host interface unit 132, the ECC unit 138, and the power management unit 140 of FIG. 5 may be included in the controller 130.

Referring to FIG. 6, the bad block controller 500 which is included in the NAND flash control unit 142 is illustrated in detail, according to an exemplary embodiment.

The bad block controller 500 may select one between the first and second channel controllers 1421 and 1422 based on a comparison result obtained by comparing bad physical addresses BAD_PA1 and BAD_PA2 corresponding to the bad blocks that are included in the first and second memory devices NAND1<1:4> and NAND2<1:4> with the first and second physical addresses PA1 and PA2 that are outputted from the address transformer 1342. The bad block controller 500 may transfer to the selected channel controller one among the first and second physical addresses PA1 and PA2, and substitute physical addresses SUB_PA1 and SUB_PA2. The substitute physical addresses SUB_PA1 and SUB_PA2 may respectively correspond to the bad physical addresses BAD_PA1 and BAD_PA2.

The bad block controller 500 may include a first bad block table 501, a second bad block table 502, and a path control element 520.

The first bad block table 501 may include the mapping relationships between the bad physical addresses BAD_PA1 and the first substitute physical addresses SUB_PA1. The second bad block table 502 may include the mapping relationships between the bad physical addresses BAD_PA2 with the second substitute physical addresses SUB_PA2. The first and second substitute physical addresses SUB_PA1 and SUB_PA2 may correspond to memory blocks of the first and second channels CH1 and CH2, respectively. That is, the first substitute physical addresses SUB_PA1 may correspond to the first memory blocks while the second substitute physical addresses SUB_PA2 may correspond to the second memory blocks. However, the bad physical addresses BAD_PA1 may correspond to the first memory blocks or to the second memory blocks, and the bad physical addresses BAD_PA2 may correspond to the first memory blocks or to the second memory blocks.

The path control element 520 may output to the first channel controller 1421 the first substitute physical addresses SUB_PA1 when the first and second physical addresses PA1 and PA2 are identical to the bad physical addresses BAD_PA1. The path control element 520 may output to the second channel controller 1422 the second substitute physical addresses SUB_PA2 when the first and second physical addresses PA1 and PA2 are identical to the bad physical addresses BAD_PA2.

The path control element 520 may output to the first channel controller 1421 the first physical address PA1 when the first physical address PA1 is not identical to the bad physical addresses BAD_PA1 and BAD_PA2. The path control element 520 may output to the second channel controller 1422 the second physical address PA2 when the second physical address PA2 is not identical to the bad physical addresses BAD_PA1 and BAD_PA2.

Herein, the path control element 520 may include a first specific path control element 521 and a second specific path control element 522.

The first specific path control element 521 may output to the first channel controller 1421 a first substitute physical address SUB_PA1 when a first physical address PA1 is identical to any of the bad physical addresses BAD_PA1. The first specific path control element 521 may output to the first channel controller 1421 a first physical address PA1 when the first physical address PA1 is not identical to any of the bad physical addresses BAD_PA1 and BAD_PA2. The first specific path control element 521 may output to the second channel controller 1422 a second substitute physical address SUB_PA2 when the first physical address PA1 is identical to any of the bad physical addresses BAD_PA2.

The second specific path control element 522 may output to the second channel controller 1422 a second substitute physical address SUB_PA2 when the second physical address PA2 is identical to any of the bad physical addresses BAD_PA2. The second specific path control element 522 may output to the second channel controller 1422 the second physical address PA2 when the second physical address PA2 is not identical to the bad physical addresses BAD_PA1 and BAD_PA2. The second specific path control element 522 may output to the first channel controller 1421 a first substitute physical addresses SUB_PA1 when a second physical address PA2 is identical to any of the bad physical addresses BAD_PA1.

The bad block controller 500 may further include a bad information loading element 540. The bad information loading element 540 may receive load information of first and second bad block physical addresses CH_BPA1 and CH_BPA2 and the substitute physical addresses SUB_PA1 and SUB_PA2 from the first and second memory devices NAND1<1:4> and NAND2<1:4>. The first and second bad block physical addresses CH_BPA1 and CH_BPA2 may correspond to the first and second memory blocks, respectively. The bad information loading element 540 may generate the first and second bad block tables 501 and 502 with respect to the first and second substitute physical addresses SUB_PA1 and SUB_PA2. The first bad block table 501 may correspond to the first substitute physical addresses SUB_PA1 while the second bad block table 502 may correspond to the second substitute physical addresses SUB_PA2. However, the first and second bad block physical addresses CH_BPA1 and CH_BPA2 need not correspond to the first and second bad block tables 501 and 502, respectively. The bad information loading element 540 may select the bad physical addresses BAD_PA1 and BAD_PA2 from the first and second bad block physical addresses CH_BPA1 and CH_BPA2 such that the bad physical addresses BAD_PA1 and BAD_PA2 correspond to the first and second bad block tables 501 and 502, respectively. The bad information loading element 540 may select the bad physical addresses BAD_PA1 and BAD_PA2 from the first and second bad block physical addresses CH_BPA1 and CH_BPA2 according to numbers of the first and second substitute physical addresses SUB_PA1 and SUB_PA2.

Meanwhile, the address transformer 1342 may perform a logical-to-physical address conversion operation and output the first and second physical addresses PA1 and PA2 in response to the logical addresses LA applied from a host 102. Herein, the address transformer 1342 may transform the logical addresses LA into the first and second physical addresses PA1 and PA2 by referring to logical-to-physical mapping information (not shown) that is stored in the memory unit 144. It is assumed that the first and second physical addresses PA1 and PA2 indicate the first and second memory blocks, respectively.

The first bad block table 501 and the second bad block table 502 included in the bad block controller 500 may be stored in a particular storage space of the bad block controller 500, as illustrated in FIG. 6, or stored in the memory unit 144 included in the controller 130. If the first bad block table 501 and the second bad block table 502 included in the bad block controller 500 are stored in the memory unit 144 which is included in the controller 130, and which is a configuration that is different from what is shown in FIG. 6, the bad block controller 500 may read and use values from the memory unit 144 whenever the first bad block table 501 and the second bad block table 502 are accessed.

The first and second bad block physical addresses CH_BPA1 and CH_BPA2 may be obtained through a test performed in the course of fabricating the first and second memory devices NAND1<1:4> and NAND2<1:4>, or during operations of the first and second memory devices NAND1<1:4> and NAND2<1:4>.

In an embodiment, an integrated bad block table including both of the first and second bad block tables 501 and 502 may be employed instead of the separated first and second bad block tables 501 and 502.

Selection of first and second substitute memory blocks respectively corresponding to the first and second substitute physical addresses SUB_PA1 and SUB_PA2 may vary according to a circuit design.

FIG. 6 exemplarily illustrates six physical address values 1<1>_700, 1<4>_800, 1<3>_900, 1<2>_400, 1<1>_950 and 1<2>_750 of the first bad block physical addresses CH_BPA1 corresponding to the bad blocks that are included in the first memory devices NAND1<1:4>, and two physical address values 2<1>_350 and 2<2>_550 of the second bad block physical addresses CH_BPA2 corresponding to the bad blocks that are included in the second memory devices NAND2<1:4>. Also, FIG. 6 exemplarily illustrates four physical address values 1<1>_900, 1<2>_830, 1<3>_520 and 1<3>_620 of the first substitute physical addresses SUB_PA1 corresponding to the substitute memory blocks that are included in the first memory devices NAND1<1:4>, and four physical address values 2<1>_700, 2<2>_530, 2<3>_820 and 2<4>_480 of the substitute physical addresses SUB_PA2 corresponding to the substitute memory blocks that are included in the second memory devices NAND2<1:4>.

The bad information loading element 540 may select as the bad physical addresses BAD_PA1 the 4 physical address values of the first bad block physical addresses CH_BPA1 according to the 4 values of the first substitute physical addresses SUB_PA1 that correspond to the first bad block table 501. The bad information loading element 540 may select as the bad physical addresses BAD_PA2 the remaining 2 physical address values of the first bad block physical addresses CH_BPA1 and the 2 physical address values of the second bad block physical addresses CH_BPA2 according to the 4 values of the second substitute physical addresses SUB_PA2 that correspond to the second bad block table 502.

For example, when the first physical address PA1 has a value '1<2>_400', the first specific path control element 521 may compare the value '1<2>_400' of the first physical address PA1 with the values of the bad physical addresses BAD_PA1 and BAD_PA2 of the first and second bad block tables 501 and 502.

When the value '1<2>_400' of the first physical address PA1 is identical to the value '1<2>_400' of the bad physical addresses BAD_PA1 of the first bad block table 501, the first specific path control element 521 may output to the first channel controller 1421 the value '1<3>_620' of the first substitute physical address SUB_PA1 mapped to the value '1<2>_400' of the bad physical addresses BAD_PA1 in the first bad block table 501. In this way, when the value of the first physical address PA1 indicates one among the bad blocks that are included in the first memory blocks, one substitute memory block among the substitute memory blocks that are included in the first memory blocks may be used.

For another example, when the first physical address PA1 has a value '1<2>_750', the first specific path control element 521 may compare the value '1<2>_750' of the first physical address PA1 with the values of the bad physical addresses BAD_PA1 and BAD_PA2 of the first and second bad block tables 501 and 502.

When the value '1<2>_750' of the first physical address PA1 is identical to the value '1<2>_750' of the bad physical addresses BAD_PA2 of the second bad block table 502, the first specific path control element 521 may output to the second channel controller 1422 the value '2<2>_530' of the second substitute physical address SUB_PA2 mapped to the value '1<2>_750' of the bad physical addresses BAD_PA2 in the second bad block table 502.

For another example, when the first physical address PA1 has a value '1<1>_600', the first specific path control element 521 may output to the first channel controller 1421 the value '1<1>_600' of the first physical address PA1 since the value of the first physical address PA1 is not identical to any one of the bad physical addresses BAD_PA1 and BAD_PA2 of the first and second bad block tables 501 and 502.

In accordance with the first embodiment of the present invention, which is described above, the memory system including a plurality of memory devices are coupled to different channels, and even though the memory devices are coupled to different channels, bad memory blocks included in each of the memory devices may be integrated and managed together.

In some embodiments, the respective channels may be divided into a plurality of ways. In this case, similar scheme may be applied to the plurality of ways as described with reference to FIGS. 5 and 6. That is, in the respective channels, the plurality of ways may be regarded as the channels described with reference to FIGS. 5 and 6.

A plurality of way controllers may respectively control the plurality of ways included in the respective channels. The channel controller may distribute address signals to the plurality of way controllers for the respective channels.

In the following embodiments of the present invention, the memory system may use a substitute memory block for a bad memory block, ways coupled to which are different from each other. However, in the following embodiment of the present invention, the memory system may not use a substitute memory block for a bad memory block, channels coupled to which are different from each other. That is, the memory system may use a substitute memory block for a bad memory block in a same channel.

Figure 7:
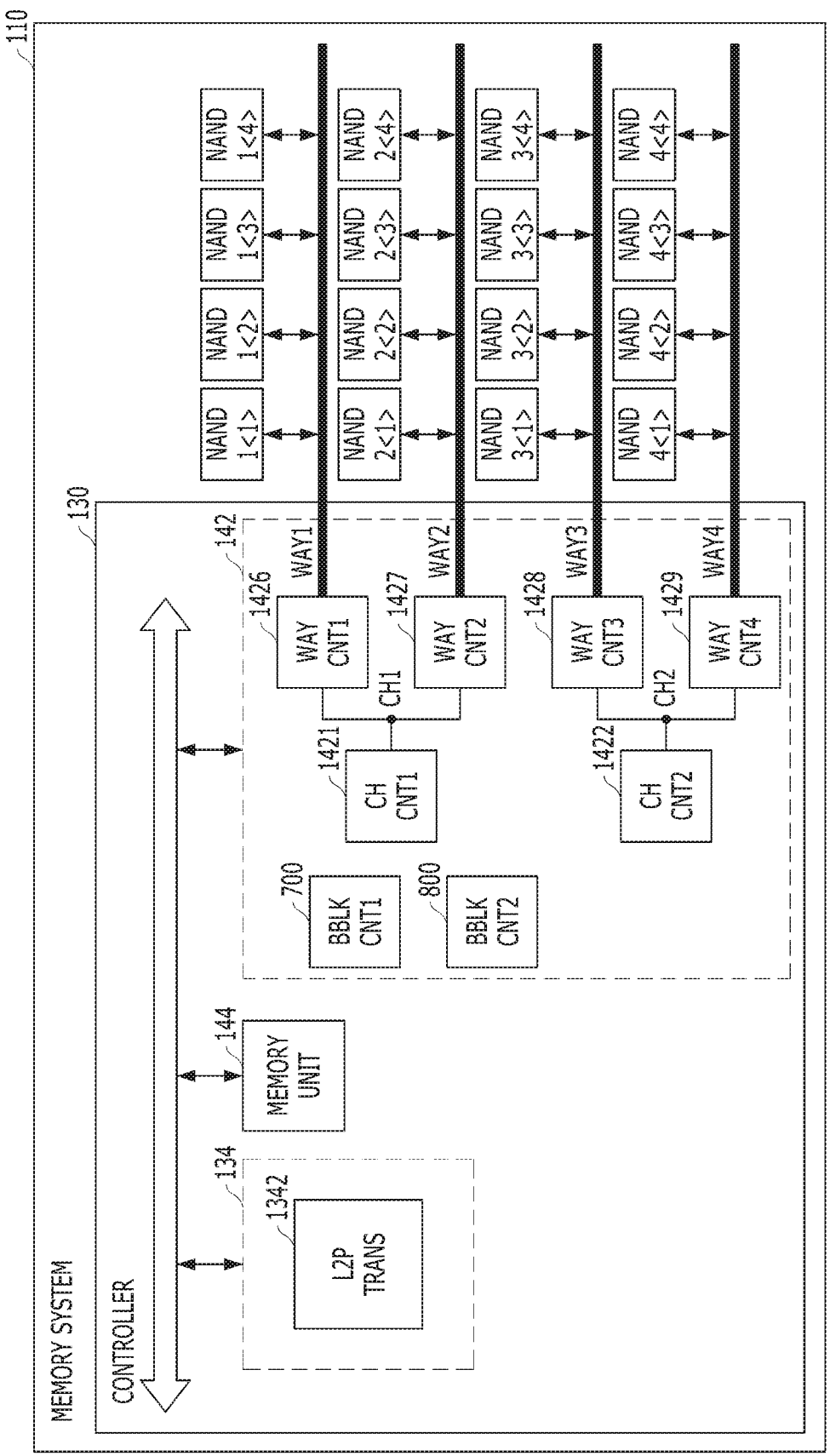
FIG. 7 is a block diagram illustrating a memory system in accordance with a second embodiment of the present invention.

FIG. 7 is a block diagram illustrating the memory system in accordance with a second embodiment of the present invention.

Figure 8:
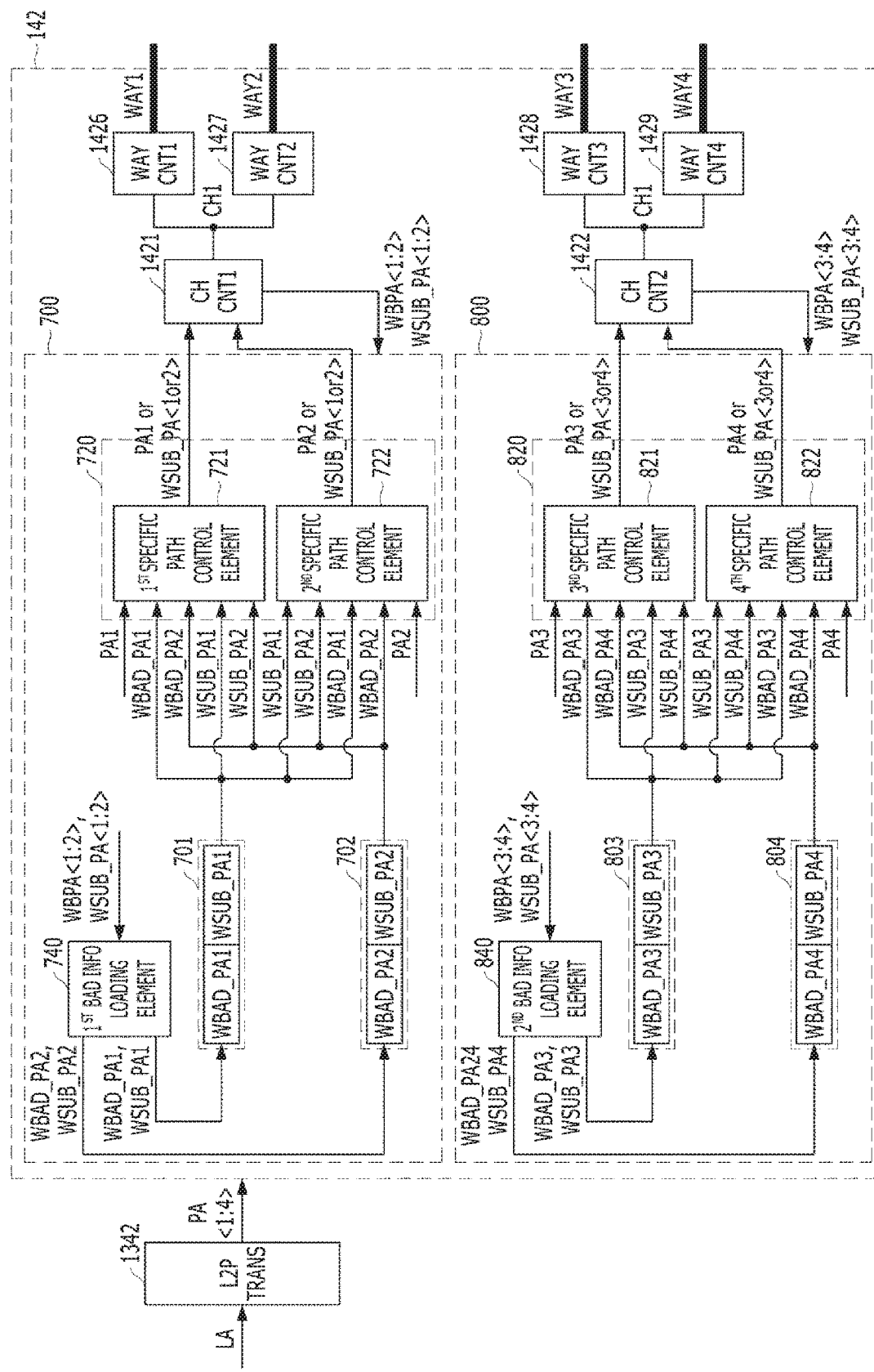
FIG. 8 is a block diagram illustrating an exemplary configuration of an NFC shown in FIG. 7.

FIG. 8 is a block diagram illustrating an exemplary configuration of the NAND flash control unit (NFC) 142 shown in FIG. 7.

Referring to FIG. 7, the memory system 110 may include a plurality of memory devices NAND1<1:4> to NAND4<1:4> respectively corresponding to the memory device 150 of FIG. 1.

The memory devices NAND1<1:4> to NAND4<1:4> may include a plurality of first memory devices NAND1<1:4> that are coupled to a first way WAY1 of a first channel CH1 and include a plurality of first memory blocks (not shown), a plurality of second memory devices NAND2<1:4> that are coupled to a second way WAY2 of the first channel CH1 and include a plurality of second memory blocks (not shown), a plurality of third memory devices NAND3<1:4> that are coupled to a first way WAY3 of a second channel CH2 and include a plurality of third memory blocks (not shown), and a plurality of fourth memory devices NAND4<1:4> that are coupled to a second way WAY4 of the second channel CH2 and include a plurality of fourth memory blocks (not shown).

Herein, FIG. 7 shows that the first memory devices NAND1<1:4> coupled to the first way WAY1 of the first channel CH1, the second memory devices NAND2<1:4> coupled to the second way WAY2 of the first channel CH1, the third memory devices NAND3<1:4> coupled to the first way WAY3 of the second channel CH2, and the fourth memory devices NAND4<1:4> coupled to the second way WAY4 of the second channel CH2 serve as the memory devices NAND1<1:4> to NAND4<1:4>. However, this is a mere exemplar embodiment of the present invention, and actually more ways and more channels and more memory devices that are respectively coupled to the ways of the channels may become the memory devices. Also, in the drawing, the first memory devices NAND1<1:4> include four memory devices NAND1<1:4>, and the second memory devices NAND2<1:4> include four memory devices NAND2<1:4>, and the third memory devices NAND3<1:4> include four memory devices NAND3<1:4>, and the fourth memory devices NAND4<1:4> include four memory devices NAND4<1:4>. This is presented just for the sake of convenience in description, and the first memory devices NAND1<1:4> may include more than or less than four memory devices, and the second memory devices NAND2<1:4> may include more than or less than four memory devices as well. Also, the third memory devices NAND3<1:4> may include more than or less than four memory devices, and the fourth memory devices NAND4<1:4> may include more than or less than four memory devices as well Also, although not directly illustrated in FIG. 7, as illustrated in FIG. 1, each of the first memory devices NAND1<1:4>, the second memory devices NAND2<1:4>, the third memory devices NAND3<1:4>, and the fourth memory devices NAND4<1:4> may include a plurality of memory blocks. For the sake of convenience in description, the memory blocks included in each of the first memory devices NAND1<1:4> may be referred to as first memory blocks, and the memory blocks included in each of the second memory devices NAND2<1:4> may be referred to as second memory blocks, and the memory blocks included in each of the third memory devices NAND3<1:4> may be referred to as third memory blocks, and the memory blocks included in each of the fourth memory devices NAND4<1:4> may be referred to as fourth memory blocks in the second embodiment of the present invention.

processor 134 processor 134 As illustrated in FIGS. 7 and 8, the processor 134 may include an address transformer 1342 which transforms the logical addresses LA of the first memory blocks into physical addresses and outputs first physical address PA1; transforms the logical addresses LA of the second memory blocks into physical addresses and outputs second physical address PA2; transforms the logical addresses LA of the third memory blocks that are included in each of the third memory devices NAND3<1:4> into physical addresses and outputs third physical address PA3; and transforms the logical addresses LA of the fourth memory blocks that are included in each of the fourth memory devices NAND4<1:4> into physical addresses and outputs fourth physical address PA4.

As illustrated in FIG. 7, the NFC 142 may include first to fourth way controllers 1426 to 1429, first and second channel controllers 1421 and 1422, first and second block controller 700 and 800.

The first way controller 1426 may control an access to the first memory devices NAND1<1:4>. The second way controller 1427 may control an access to the second memory devices NAND2<1:4>. The third way controller 1428 may control an access to the third memory devices NAND3<1:4>. The fourth way controller 1429 may control an access to the fourth memory devices NAND4<1:4>.

The first channel controller 1421 may control an access to the first and second way controllers 1426 and 1427. The second channel controller 1422 may control an access to the third and fourth way controllers 1428 and 1429.

The first bad block controller 700 may integrate and manage bad memory blocks that are included in the first and second memory devices NAND1<1:4> and NAND2<1:4>. The second bad block controller 800 may integrate and manage bad memory blocks that are included in the third and fourth memory devices NAND3<1:4> and NAND4<1:4>.

The memory unit 144 may buffer data during the operations of the processor 134 and the NFC 142. processor 134

Herein, it is illustrated in FIG. 7 that a host interface (I/F) unit 132, an Error Correction Code (ECC) unit 138, and a power management unit 140 are not included in the controller 130, whereas the host interface unit 132, the ECC unit 138, and the power management unit 140 are illustrated to be included in the controller 130 in FIG. 1. However, this is for the sake of convenience in description, and actually, the host interface unit 132, the ECC unit 138, and the power management unit 140 of FIG. 7 may be included in the controller 130.

Referring to FIG. 8, the first and second bad block controllers 700 and 800 are illustrated in detail.

The first bad block controller 700 may select the first channel controller 1421 and one between the first and second way controllers 1426 and 1427 by comparing first channel bad physical addresses WBAD_PA1 and WBAD_PA2 corresponding to the bad blocks that are included in the first and second memory devices NAND1<1:4> and NAND2<1:4> with the first and second physical addresses PA1 and PA2 that are outputted from the address transformer 1342, and transfer one among the first and second physical addresses PA1 and PA2, and substitute physical addresses WSUB_PA1 and WSUB_PA2 which correspond to the first channel bad physical addresses WBAD_PA1 and WBAD_PA2 to the selected one way controller 1426 or 1427.

Also, the second bad block controller 800 may select one between the third and fourth way controllers 1428 and 1429 by comparing second channel bad physical addresses WBAD_PA3 and WBAD_PA4 corresponding to the bad blocks that are included in the third and fourth memory devices NAND3<1:4> and NAND4<1:4> with the third and fourth physical addresses PA3 and PA4 that are outputted from the address transformer 1342, and transfer one among the third and fourth physical addresses PA3 and PA4, and substitute physical addresses WSUB_PA3 and WSUB_PA4 which correspond to the second channel bad physical addresses WBAD_PA3 and WBAD_PA4 to the selected one way controller 1428 or 1429.

The first bad block controller 700 may include a first bad block table 701, a second bad block table 702, and a first path control element 720.

The first bad block table 701 may map the predetermined first bad physical addresses WBAD_PA1 to first substitute physical addresses WSUB_PA1 which correspond to the first memory blocks.

The second bad block table 702 may map the predetermined second bad physical addresses WBAD_PA2 to second substitute physical addresses WSUB_PA2 which correspond to the second memory blocks.

The first path control element 720 may select the first channel controller 1421 and the first way controller 1426 and transfer the first substitute physical addresses WSUB_PA1 when the first physical address PA1 and the second physical addresses PA2 are included in the first bad physical addresses WBAD_PA1; select the first channel controller 1421 and the second way controller 1427 and transfer the second substitute physical addresses WSUB_PA2 when the first and second physical addresses PA1 and PA2 are included in the remaining second bad physical addresses WBAD_PA2; and select the first channel controller 1421 and the first way controller 1426 and transfer the first physical address PA1 or select the first channel controller 1421 and the second way controller 1427 and transfer the second physical address PA2 when the first and second physical addresses PA1 and PA2 are not included in the first channel bad physical addresses WBAD_PA1 and WBAD_PA2.

Also, the second bad block controller 800 may include a third bad block table 803, a fourth bad block table 804, and a second path control element 820.

The third bad block table 803 may map the predetermined third bad physical addresses WBAD_PA3 to third substitute physical addresses WSUB_PA3 which correspond to the third memory blocks.

The fourth bad block table 804 may map the predetermined fourth bad physical addresses WBAD_PA4 to fourth substitute physical addresses WSUB_PA4 which correspond to the fourth memory blocks.

The second path control element 820 may select the second channel controller 1422 and the third way controller 1428 and transfer the third substitute physical addresses WSUB_PA3 when the third and fourth physical addresses PA3 and PA4 are included in the third bad physical addresses WBAD_PA3; select the second channel controller 1422 and the fourth way controller 1429 and transfer the fourth substitute physical addresses WSUB_PA4 when the third and fourth physical addresses PA3 and PA4 are included in the fourth bad physical addresses WBAD_PA4; and select the second channel controller 1422 and the third way controller 1428 and transfer the third physical address PA3 or select the second channel controller 1422 and the fourth way controller 1429 and transfer the fourth physical address PA4 when the third and fourth physical addresses PA3 and PA4 are not included in the second channel bad physical addresses WBAD_PA3 and WBAD_PA4.

Herein, the first path control element 720 may include a first specific path control element 721 and a second specific path control element 722.

The first specific path control element 721 may select the first channel controller 1421 and the first way controller 1426 and transfer the first substitute physical addresses WSUB_PA1 when the first physical address PA1 are included in the first bad physical addresses WBAD_PA1; select the first channel controller 1421 and the second way controller 1427 and transfer the second substitute physical addresses WSUB_PA2 when the first physical address PA1 are included in the second bad physical addresses WBAD_PA2; and select the first channel controller 1421 and the first way controller 1426 and transfer the first physical address PA1 when the first physical address PA1 are not included in the first channel bad physical addresses WBAD_PA1 and WBAD_PA2.

The second specific path control element 722 may select the first channel controller 1421 and the second way controller 1427 and transfer the second substitute physical addresses WSUB_PA2 when the second physical address PA2 are included in the second bad physical addresses WBAD_PA2; select the first channel controller 1421 and the first way controller 1426 and transfer the first substitute physical addresses WSUB_PA1 when the second physical address PA2 are included in the first bad physical addresses WBAD_PA1; and select the first channel controller 1421 and the second way controller 1427 and transfer the second physical address PA2 when the second physical address PA2 are not included in the first channel bad physical addresses WBAD_PA1 and WBAD_PA2.

Also, the second path control element 820 may include a third specific path control element 821 and a fourth specific path control element 822.

The third specific path control element 821 may select the second channel controller 1422 and the third way controller 1428 and transfer the third substitute physical addresses WSUB_PA3 when the third physical address PA3 are included in the third bad physical addresses WBAD_PA3; select the second channel controller 1422 and the fourth way controller 1429 and transfer the fourth substitute physical addresses WSUB_PA4 when the third physical address PA3 are included in the fourth bad physical addresses WBAD_PA4; and select the second channel controller 1422 and the third way controller 1428 and transfer the third physical address PA3 when the third physical address PA3 are not included in the second channel bad physical addresses WBAD_PA3 and WBAD_PA4.

The fourth specific path control element 822 may select the second channel controller 1422 and the fourth way controller 1429 and transfer the fourth substitute physical addresses WSUB_PA4 when the fourth physical address PA4 are included in the fourth bad physical addresses WBAD_PA4; select the second channel controller 1422 and the third way controller 1428 and transfer the third substitute physical addresses WSUB_PA3 when the fourth physical address PA4 are included in the third bad physical addresses WBAD_PA3; and select the second channel controller 1422 and the fourth way controller 1429 and transfer the fourth physical address PA4 when the fourth physical address PA4 are not included in the second channel bad physical addresses WBAD_PA3 and WBAD_PA4.

The first bad block controller 700 may further include a first bad information loading element 740 which may load information of bad block physical addresses WBPA<1:2> and the first and second substitute physical addresses WSUB_PA1 and WSUB_PA2 that are stored in the first and second memory devices NAND1<1:4> and NAND2<1:4>, decide which of the first and second substitute physical addresses WSUB_PA1 and WSUB_PA2 are to be mapped to the bad block physical addresses WBPA<1:2> based on the number of the loaded bad block physical addresses WBPA<1:2>, and generate the first bad block table 701 and the second bad block table 702.

Herein, the first bad information loading element 740 may generate the first bad block table 701 including the first bad physical addresses WBAD_PA1 and the second bad block table 702 including the second bad physical addresses WBAD_PA2 by checking out the total number of the bad block physical addresses WBPA<1:2> that are stored in the first and second memory devices NAND1<1:4> and NAND2<1:4>, and distributing the bad block physical addresses WBPA<1:2> in such a manner that the number of the first bad physical addresses WBAD_PA1 and the number of the second bad physical addresses WBAD_PA2 do not exceed a predetermined number of difference.

The second bad block controller 800 may further include a second bad information loading element 840 which may load information of bad block physical addresses WBPA<3:4> and the third and fourth substitute physical addresses WSUB_PA3 and WSUB_PA4 that are stored in the third and fourth memory devices NAND3<1:4> and NAND4<1:4>, decide which of the third and fourth substitute physical addresses WSUB_PA3 and WSUB_PA4 are to be mapped to the bad block physical addresses WBPA<3:4> based on the number of the loaded bad block physical addresses WBPA<3:4>, and generate the third bad block table 803 and the fourth bad block table 804.

Herein, the second bad information loading element 840 may generate the third bad block table 803 including the third bad physical addresses WBAD_PA3 and the fourth bad block table 804 including the fourth bad physical addresses WBAD_PA4 by checking out the total number of the bad block physical addresses WBPA<3:4> that are stored in the third and fourth memory devices NAND3<1:4> and NAND4<1:4>, and distributing the bad block physical addresses WBPA<3:4> in such a manner that the number of the third bad physical addresses WBAD_PA3 and the number of the fourth bad physical addresses WBAD_PA4 do not exceed a predetermined number of difference.

Meanwhile, the address transformer 1342 may perform a logical-to-physical address conversion operation and output the physical addresses PA1 to PA4 in response to the logical addresses LA applied from a host 102. Herein, the address transformer 1342 may transform the logical addresses LA into the physical addresses PA1 to PA4 by referring to logical-to-physical mapping information (not shown) that is stored in the memory unit 144. Since the logical-to-physical address conversion is known technology, further description on it is not provided herein. Also, it is general to output a physical address capable of indicating a page unit through the logical-to-physical address conversion. However, since the embodiment of the present invention does not describe a structure using a physical address indicating a page unit, it is assumed that the physical addresses PA1 to PA4 which are outputted through the address transformer 1342 are physical addresses indicating memory blocks. In other words, the first physical address PA1 among the physical addresses PA1 to PA4 outputted from the address transformer 1342 may be information indicating the first memory blocks (not shown), and the second physical address PA2 may be information indicating the second memory blocks (not shown). The third physical address PA3 among the physical addresses PA1 to PA4 outputted from the address transformer 1342 may be information indicating the third memory blocks (not shown) that are included in each of the third memory devices NAND3<1:4>, and the fourth physical address PA4 may be information indicating the fourth memory blocks (not shown) that are included in each of the fourth memory devices NAND4<1:4>.

The first bad block table 701 and the second bad block table 702 included in the first bad block controller 700 and the third bad block table 803 and the fourth bad block table 804 included in the second bad block controller 800 may be stored in a particular storage space of the first and second bad block controllers 700 and 800, as illustrated in FIG. 8, or stored in the memory unit 144 included in the controller 130. If the first bad block table 701 and the second bad block table 702 included in the first bad block controller 700 and the third bad block table 803 and the fourth bad block table 804 included in the second bad block controller 800 are stored in the memory unit 144 included in the controller 130, which is different from what is shown in FIG. 8, the first and second bad block controllers 700 and 800 may read and use values from the memory unit 144 whenever the first bad block table 701, the second bad block table 702, the third bad block table 803, and the fourth bad block table 804 are accessed.

The bad block physical addresses WBPA<1:4> stored in the first to fourth memory devices NAND1<1:4> to NAND4<1:4> may have predetermined values through a test performed in the course of producing the first to fourth memory devices NAND1<1:4> to NAND4<1:4>. Also, it is possible to detect internal bad memory blocks in the operation process of the first to fourth memory devices NAND1<1:4> to NAND4<1:4>, and decide the values of the bad block physical addresses WBPA<1:4>.

First substitute memory blocks may be selected among the first memory blocks included in the first memory devices NAND1<1:4>. Herein, there may be some first memory blocks whose usage is decided as the first substitute memory blocks among the first memory blocks. Also, some arbitrary memory blocks which are in a free state among the first memory blocks may be selected as the first substitute memory blocks. Likewise, second substitute memory blocks may be selected among the second memory blocks included in the second memory devices NAND2<1:4>. Herein, there may be some second memory blocks whose usage is decided as the second substitute memory blocks among the second memory blocks. Also, some arbitrary memory blocks which are in a free state among the second memory blocks may be selected as the second substitute memory blocks. Third substitute memory blocks may be selected among the third memory blocks included in the third memory devices NAND3<1:4>. Herein, there may be some third memory blocks whose usage is decided as the third substitute memory blocks among the third memory blocks. Also, some arbitrary memory blocks which are in a free state among the third memory blocks may be selected as the third substitute memory blocks. Likewise, fourth substitute memory blocks may be selected among the fourth memory blocks included in the fourth memory devices NAND4<1:4>. Herein, there may be some fourth memory blocks whose usage is decided as the fourth substitute memory blocks among the fourth memory blocks. Also, some arbitrary memory blocks which are in a free state among the fourth memory blocks may be selected as the fourth substitute memory blocks. The method of selecting the first substitute memory blocks, the second substitute memory blocks, the third substitute memory blocks, and the fourth substitute memory blocks may be selected by a designer, and the physical address values corresponding to the selected first substitute memory blocks, the physical address values corresponding to the selected second substitute memory blocks, the physical address values corresponding to the selected third substitute memory blocks, and the physical address values corresponding to the selected fourth substitute memory blocks may be used as the first substitute physical addresses WSUB_PA1, the second substitute physical addresses WSUB_PA2, the third substitute physical addresses WSUB_PA3, and the fourth substitute physical addresses WSUB_PA4 in the first bad information loading element 740 and the second bad information loading element 840.

When the value of a first physical address PA1 represents one bad block among the bad blocks that are included in the first memory blocks, the first bad block controller 700 may allow one substitute memory block among the substitute memory blocks that are included in the first memory blocks to be used, or allow one substitute memory block among the substitute memory blocks that are included in the second memory blocks to be used. Likewise, when the value of a second physical address PA2 represents one bad block among the bad blocks that are included in the second memory blocks, the first bad block controller 700 may allow one substitute memory block among the substitute memory blocks that are included in the second memory blocks to be used, or allow one substitute memory block among the substitute memory blocks that are included in the first memory blocks to be used.

When the value of a third physical address PA3 represents one bad block among the bad blocks that are included in the third memory blocks, the second bad block controller 800 may allow one substitute memory block among the substitute memory blocks that are included in the third memory blocks to be used, or allow one substitute memory block among the substitute memory blocks that are included in the fourth memory blocks to be used. Likewise, when the value of a fourth physical address PA4 represents one bad block among the bad blocks that are included in the fourth memory blocks, the second bad block controller 800 may allow one substitute memory block among the substitute memory blocks that are included in the fourth memory blocks to be used, or allow one substitute memory block among the substitute memory blocks that are included in the third memory blocks to be used.

To sum up, it may be seen that the operation of the above-described first bad block controller 700 is similar to the operation of the bad block controller 500 which is described with reference to FIG. 6. Also, it may be seen that the operation of the above-described second bad block controller 800 is similar to the operation of the bad block controller 500 which is described with reference to FIG. 6. In short, the bad block controller 500, which is described with reference to FIG. 6, has a structure of integrating and managing the bad memory blocks that are included in the first and second memory devices NAND1<1:4> and NAND2<1:4> that are coupled to different channels CH1 and CH2. Herein, it may be seen that the structure of the bad block controller 500 of FIG. 6 is similar to the structure of the first bad block controller 700 described with reference to FIG. 8 that the bad memory blocks included in the first and second memory devices NAND1<1:4> and NAND2<1:4> which are coupled to different ways WAY1 and WAY2 are integrated and managed together. Likewise, the structure of the bad block controller 500 of FIG. 6 is similar to the structure of the second bad block controller 800 described with reference to FIG. 8 that the bad memory blocks included in the third and fourth memory devices NAND3<1:4> and NAND4<1:4> which are coupled to different ways WAY3 and WAY4 are integrated and managed together.

As described above, in accordance with the second embodiment of the present invention, management for the bad memory blocks included in the memory devices which are coupled to different ways may be integrated in the memory system including a plurality of memory devices that are coupled to different ways.

Figure 9:
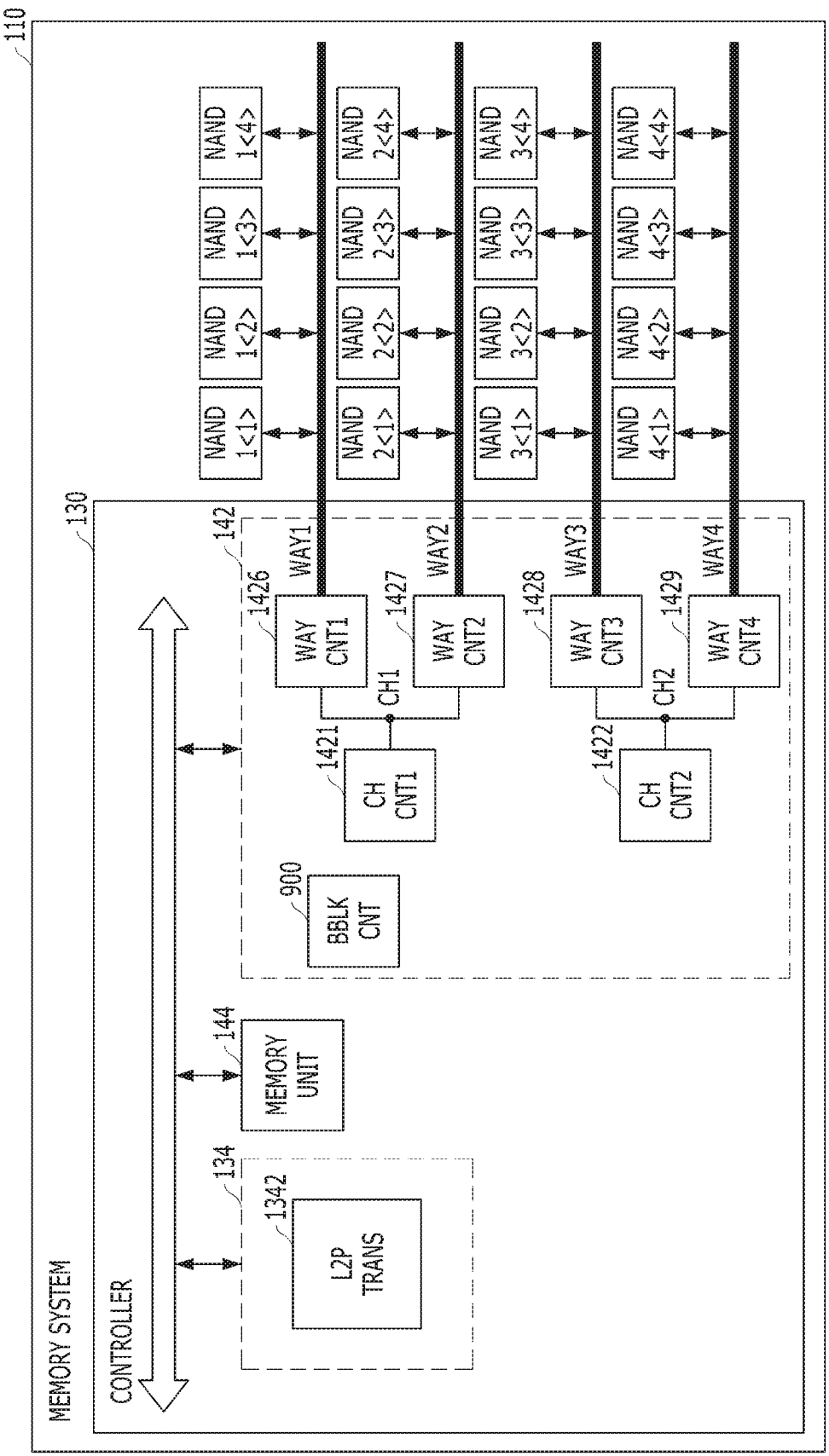
FIG. 9 is a block diagram illustrating a memory system in accordance with a third embodiment of the present invention.

FIG. 9 is a block diagram illustrating the memory system in accordance with a third embodiment of the present invention.

Figure 10:
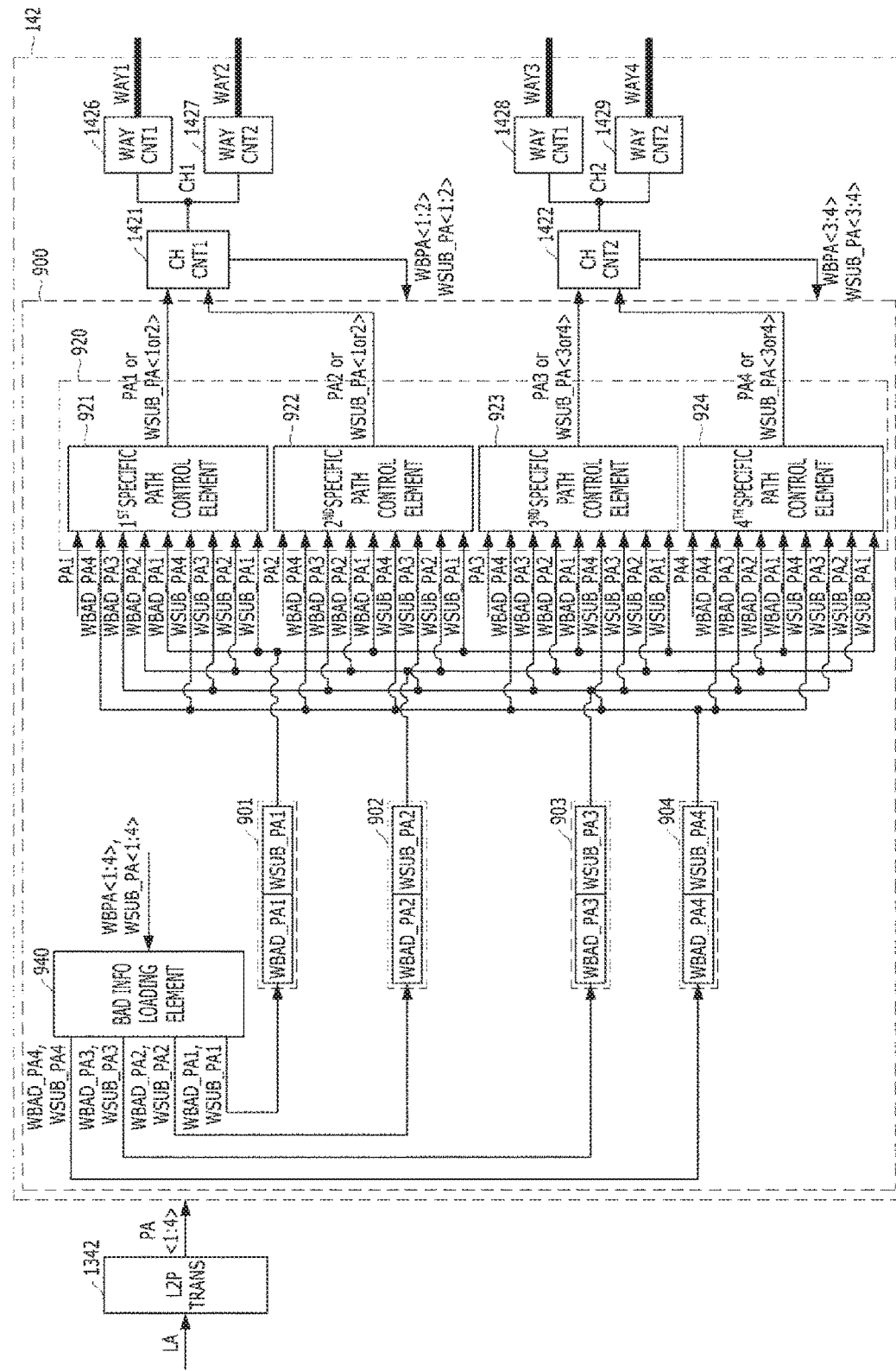
FIG. 10 is a block diagram illustrating an exemplary configuration of an NFC shown in FIG. 9.

FIG. 10 is a block diagram illustrating an exemplary configuration of the NAND flash control unit (NFC) 142 shown in FIG. 9.

Referring to FIG. 9, the memory system 110 may include a plurality of memory devices NAND1<1:4> to NAND4<1:4> respectively corresponding to the memory device 150 of FIG. 1.

The memory devices NAND1<1:4> to NAND4<1:4> may include a plurality of first memory devices NAND1<1:4> that are coupled to a first way WAY1 of a first channel CH1 and include a plurality of first memory blocks (not shown), a plurality of second memory devices NAND2<1:4> that are coupled to a second way WAY2 of the first channel CH1 and include a plurality of second memory blocks (not shown), a plurality of third memory devices NAND3<1:4> that are coupled to a first way WAY3 of a second channel CH2 and include a plurality of third memory blocks (not shown), and a plurality of fourth memory devices NAND4<1:4> that are coupled to a second way WAY4 of the second channel CH2 and include a plurality of fourth memory blocks (not shown).

Herein, FIG. 9 shows that the first memory devices NAND1<1:4> coupled to the first way WAY1 of the first channel CH1, the second memory devices NAND2<1:4> coupled to the second way WAY2 of the first channel CH1, the third memory devices NAND3<1:4> coupled to the first way WAY3 of the second channel CH2, and the fourth memory devices NAND4<1:4> coupled to the second way WAY4 of the second channel CH2 serve as the memory devices NAND1<1:4> to NAND4<1:4>. For the sake of convenience in description, the memory blocks included in each of the first memory devices NAND1<1:4> may be referred to as first memory blocks, the memory blocks included in each of the second memory devices NAND2<1:4> may be referred to as second memory blocks, the memory blocks included in each of the third memory devices NAND3<1:4> may be referred to as third memory blocks, and the memory blocks included in each of the fourth memory devices NAND4<1:4> may be referred to as fourth memory blocks in the second embodiment of the present invention.

As illustrated in FIGS. 9 and 10, the processor 134 may include an address transformer 1342 which transforms the logical addresses LA of the first memory blocks into physical addresses and outputs first physical address PA1; transforms the logical addresses LA of the second memory blocks into physical addresses and outputs second physical address PA2; transforms the logical addresses LA of the third memory blocks that are included in each of the third memory devices NAND3<1:4> into physical addresses and outputs third physical address PA3; and transforms the logical addresses LA of the fourth memory blocks that are included in each of the fourth memory devices NAND4<1:4> into physical addresses and outputs fourth physical address PA4.

As illustrated in FIG. 9, the NFC 142 may include first to fourth way controllers 1426 to 1429, first and second channel controllers 1421 and 1422, and a bad block controller 900.

The first way controller 1426 may control an access to the first memory devices NAND1<1:4>, the second way controller 1427 may control an access to the second memory devices NAND2<1:4>, the third way controller 1428 may control an access to the third memory devices NAND3<1:4>, and he fourth way controller 1429 may control an access to the fourth memory devices NAND4<1:4>.

The first channel controller 1421 may control an access to the first and second way controllers 1426 and 1427 and the second channel controller 1422 may control an access to the third and fourth way controllers 1428 and 1429.

The bad block controller 900 may integrate and manage bad memory blocks that are included in the first to fourth memory devices NAND1<1:4> to NAND4<1:4>.

The memory unit 144 may buffer data during the operations of the processor 134 and the NFC 142.

Herein, it is illustrated in FIG. 9 that a host interface (I/F) unit 132, an Error Correction Code (ECC) unit 138, and a power management unit 140 are not included in the controller 130, whereas the host interface unit 132, the ECC unit 138, and the power management unit 140 are illustrated to be included in the controller 130 in FIG. 1. However, this is for the sake of convenience in description, and actually, the host interface unit 132, the ECC unit 138, and the power management unit 140 of FIG. 9 may be included in the controller 130.

Referring to FIG. 10, an exemplary configuration of the bad block controller 900 is illustrated in detail.

The bad block controller 900 may select one between the first and second controller 1421 and 1422, and then select one among the first to fourth second way controllers 1426 to 1429 which relate to the selected one between the first and second controller 1421 and 1422 by comparing bad physical addresses WBAD_PA1, WBAD_PA2, WBAD_PA3 and WBAD_PA4 corresponding to the bad blocks that are included in the first to fourth memory devices NAND1<1:4> to NAND4<1:4> with the first to fourth physical addresses PA1 to PA4 that are outputted from the address transformer 1342, and transfer one among the first to fourth physical addresses PA1 to PA4, and substitute physical addresses WSUB_PA1, WSUB_PA2, WSUB_PA3 and WSUB_PA4 which correspond to the bad physical addresses WBAD_PA1, WBAD_PA2, WBAD_PA3 and WBAD_PA4 to the selected one way controller 1426 or 1427 or 1428 or 1429.

The bad block controller 900 may include first to fourth bad block tables 901, 902, 903, and 904, and a path control element 920.

The first bad block table 901 may map the predetermined first bad physical addresses WBAD_PA1 to first substitute physical addresses WSUB_PA1 which correspond to the first memory blocks.

The second bad block table 902 may map the predetermined second bad physical addresses WBAD_PA2 to second substitute physical addresses WSUB_PA2 which correspond to the second memory blocks.

The third bad block table 903 may map the predetermined third bad physical addresses WBAD_PA3 to third substitute physical addresses WSUB_PA3 which correspond to the third memory blocks.

The fourth bad block table 904 may map the predetermined fourth bad physical addresses WBAD_PA4 to fourth substitute physical addresses WSUB_PA4 which correspond to the fourth memory blocks.

The path control element 920 may select the first channel controller 1421 and the first way controller 1426 and transfer the first substitute physical addresses WSUB_PA1 when the first to fourth physical addresses PA1 to PA4 are included in the first bad physical addresses WBAD_PA1; select the first channel controller 1421 and the second way controller 1427 and transfer the second substitute physical addresses WSUB_PA2 when the first to fourth physical addresses PA1 to PA4 are included in the second bad physical addresses WBAD_PA2; select the second channel controller 1422 and the third way controller 1428 and transfer the third substitute physical addresses WSUB_PA3 when the first to fourth physical addresses PA1 to PA4 are included in the third bad physical addresses WBAD_PA3; select the second channel controller 1422 and the fourth way controller 1429 and transfer the fourth substitute physical addresses WSUB_PA4 when the first to fourth physical addresses PA1 to PA4 are included in the fourth bad physical addresses WBAD_PA4; and select the first channel controller 1421 and the first way controller 1426 and transfer the first physical address PA1, or select the first channel controller 1421 and the second way controller 1427 and transfer the second physical address PA2, or select the second channel controller 1422 and the third way controller 1428 and transfer the third physical address PA3, or select the second channel controller 1422 and the fourth way controller 1429 and transfer the fourth physical address PA4 when the first to fourth physical addresses PA1 to PA4 are not included in the bad physical addresses WBAD_PA1, WBAD_PA2, WBAD_PA3 and WBAD_PA4.

Herein, the path control element 920 may include first to fourth specific path control elements 921, 922, 923 and 924.

The first specific path control element 921 may select the first channel controller 1421 and the first way controller 1426 and transfer the first substitute physical addresses WSUB_PA1 when the first is physical address PA1 are included in the first bad physical addresses WBAD_PA1; select the first channel controller 1421 and the second way controller 1427 and transfer the second substitute physical addresses WSUB_PA2 when the first physical address PA1 are included in the second bad physical addresses WBAD_PA2; select the second channel controller 1422 and the third way controller 1428 and transfer the third substitute physical addresses WSUB_PA3 when the first physical address PA1 are included in the third bad physical addresses WBAD_PA3; select the second channel controller 1422 and the fourth way controller 1429 and transfer the fourth substitute physical addresses WSUB_PA4 when the first physical address PA1 are included in the fourth bad physical addresses WBAD_PA4; and select the first channel controller 1421 and the first way controller 1426 and transfer the first physical address PA1 when the first physical address PA1 are not included in the bad physical addresses WBAD_PA1, WBAD_PA2, WBAD_PA3 and WBAD_PA4.

The second specific path control element 922 may select the first channel controller 1421 and the first way controller 1426 and transfer the first substitute physical addresses WSUB_PA1 when the second physical address PA2 are included in the first bad physical addresses WBAD_PA1; select the first channel controller 1421 and the second way controller 1427 and transfer the second substitute physical addresses WSUB_PA2 when the second physical address PA2 are included in the second bad physical addresses WBAD_PA2; select the second channel controller 1422 and the third way controller 1428 and transfer the third substitute physical addresses WSUB_PA3 when the second physical address PA2 are included in the third bad physical addresses WBAD_PA3; select the second channel controller 1422 and the fourth way controller 1429 and transfer the fourth substitute physical addresses WSUB_PA4 when the second physical address PA2 are included in the fourth bad physical addresses WBAD_PA4; and select the first channel controller 1421 and the second way controller 1427 and transfer the second physical address PA2 when the second physical address PA2 are not included in the bad physical addresses WBAD_PA1, WBAD_PA2, WBAD_PA3 and WBAD_PA4.

The third specific path control element 923 may select the first channel controller 1421 and the first way controller 1426 and transfer the first substitute physical addresses WSUB_PA1 when the third physical address PA3 are included in the first bad physical addresses WBAD_PA1; select the first channel controller 1421 and the second way controller 1427 and transfer the second substitute physical addresses WSUB_PA2 when the third physical address PA3 are included in the second bad physical addresses WBAD_PA2; select the second channel controller 1422 and the third way controller 1428 and transfer the third substitute physical addresses WSUB_PA3 when the third physical address PA3 are included in the third bad physical addresses WBAD_PA3; select the second channel controller 1422 and the fourth way controller 1429 and transfer the fourth substitute physical addresses WSUB_PA4 when the third physical address PA3 are included in the fourth bad physical addresses WBAD_PA4; and select the second channel controller 1422 and the third way controller 1428 and transfer the third physical address PA3 when the third physical address PA3 are not included in the bad physical addresses WBAD_PA1, WBAD_PA2, WBAD_PA3 and WBAD_PA4.

The fourth specific path control element 924 may select the first channel controller 1421 and the first way controller 1426 and transfer the first substitute physical addresses WSUB_PA1 when the fourth physical address PA4 are included in the first bad physical addresses WBAD_PA1; select the first channel controller 1421 and the second way controller 1427 and transfer the second substitute physical addresses WSUB_PA2 when the fourth physical address PA4 are included in the second bad physical addresses WBAD_PA2; select the second channel controller 1422 and the third way controller 1428 and transfer the third substitute physical addresses WSUB_PA3 when the fourth physical address PA4 are included in the third bad physical addresses WBAD_PA3; select the second channel controller 1422 and the fourth way controller 1429 and transfer the fourth substitute physical addresses WSUB_PA4 when the fourth physical address PA4 are included in the fourth bad physical addresses WBAD_PA4; and select the second channel controller 1422 and the fourth way controller 1429 and transfer the fourth physical address PA4 when the fourth physical address PA4 are not included in the bad physical addresses WBAD_PA1, WBAD_PA2, WBAD_PA3 and WBAD_PA4.

The bad block controller 900 may further include a bad information loading element 940 which may load information of bad block physical addresses WBPA<1:2> and WBPA<3:4> and the first to fourth substitute physical addresses WSUB_PA<1:2> and WSUB_PA<3:4> that are stored in the first to fourth memory devices NAND1<1:4> to NAND4<1:4>, decide which of the first to fourth substitute physical addresses WSUB_PA<1:2> and WSUB_PA<3:4> are to be mapped to the bad block physical addresses WBPA<1:2> and WBPA<3:4> based on the number of the loaded bad block physical addresses WBPA<1:2> and WBPA<3:4>, and generate the first to fourth bad block tables 901 to 904.

Herein, the bad information loading element 940 may generate the first bad block table 901 including the first bad physical addresses WBAD_PA1, the second bad block table 902 including the second bad physical addresses WBAD_PA2, the third bad block table 903 including the third bad physical addresses WBAD_PA3, and the fourth bad block table 904 including the fourth bad physical addresses WBAD_PA4 by checking out the total number of the bad block physical addresses WBPA<1:2> and WBPA<3:4> that are stored in the first to fourth memory devices NAND1<1:4> to NAND4<1:4> and distributing the bad block physical addresses WBPA<1:4> in such a manner that the number of the first bad physical addresses WBAD_PA1, the number of the second bad physical addresses WBAD_PA2, the third bad physical addresses WBAD_PA3, and the number of the fourth bad physical addresses WBAD_PA4 do not exceed a predetermined number of difference.

Meanwhile, the address transformer 1342 may perform a logical-to-physical address conversion operation and output the physical addresses PA1 to PA4 in response to the logical addresses LA applied from a host 102. Herein, the address transformer 1342 may transform the logical addresses LA into the physical addresses PA1 to PA4 by referring to logical-to-physical mapping information (not shown) that is stored in the memory unit 144. Since the logical-to-physical address conversion is known technology, further description on it is not provided herein. Also, it is general to output a physical address capable of indicating a page unit through the logical-to-physical address conversion. However, since the embodiment of the present invention does not describe a structure using a physical address indicating a page unit, it is assumed that the physical addresses PA1 to PA4 which are outputted through the address transformer 1342 are physical addresses indicating memory blocks. In other words, the first physical address PA1 among the physical addresses PA1 to PA4 outputted from the address transformer 1342 may be information indicating the first memory blocks (not shown), and the second physical address PA2 may be information indicating the second memory blocks (not shown), and the third physical address PA3 among the physical addresses PA1 to PA4 outputted from the address transformer 1342 may be information indicating the third memory blocks (not shown) that are included in each of the third memory devices NAND3<1:4>, and the fourth physical address PA4 may be information indicating the fourth memory blocks (not shown) that are included in each of the fourth memory devices NAND4<1:4>.

The first to fourth bad block tables 901 to 904 included in the bad block controller 900 may be stored in a particular storage space of the bad block controller 900, as illustrated in FIG. 10, or stored in the memory unit 144 included in the controller 130. If the first to fourth bad block tables 901 to 904 included in the bad block controller 900 are stored in the memory unit 144 included in the controller 130, which is different from what is shown in FIG. 10, the bad block controller 900 may read and use values from the memory unit 144 whenever the first to fourth bad block tables 901 to 904 are accessed.

The bad block physical addresses WBPA<1:4> stored in the first to fourth memory devices NAND1<1:4> to NAND4<1:4> may have predetermined values through a test in the course of producing the first to fourth memory devices NAND1<1:4> to NAND4<1:4>. Also, it is possible to detect internal bad memory blocks in the operation process of the first to fourth memory devices NAND1<1:4> to NAND4<1:4>, and decide the values of the bad block physical addresses WBPA<1:4>.

First substitute memory blocks may be selected among the first memory blocks included in the first memory devices NAND1<1:4>. Herein, there may be some first memory blocks whose usage is decided as the first substitute memory blocks among the first memory blocks. Also, some arbitrary memory blocks which are in a free state among the first memory blocks may be selected as the first substitute memory blocks. Likewise, second substitute memory blocks may be selected among the second memory blocks included in the second memory devices NAND2<1:4>. Herein, there may be some second memory blocks whose usage is decided as the second substitute memory blocks among the second memory blocks. Also, some arbitrary memory blocks which are in a free state among the second memory blocks may be selected as the second substitute memory blocks. Third substitute memory blocks may be selected among the third memory blocks included in the third memory devices NAND3<1:4>. Herein, there may be some third memory blocks whose usage is decided as the third substitute memory blocks among the third memory blocks. Also, some arbitrary memory blocks which are in a free state among the third memory blocks may be selected as the third substitute memory blocks. Likewise, fourth substitute memory blocks may be selected among the fourth memory blocks included in the fourth memory devices NAND4<1:4>. Herein, there may be some fourth memory blocks whose usage is decided as the fourth substitute memory blocks among the fourth memory blocks. Also, some arbitrary memory blocks which are in a free state among the fourth memory blocks may be selected as the fourth substitute memory blocks. The method of selecting the first substitute memory blocks, the second substitute memory blocks, the third substitute memory blocks, and the fourth substitute memory blocks may be selected by a designer, and the physical address values corresponding to the selected first substitute memory blocks, the physical address values corresponding to the selected second substitute memory blocks, the physical address values corresponding to the selected third substitute memory blocks, and the physical address values corresponding to the selected fourth substitute memory blocks may be used as the first substitute physical addresses WSUB_PA1, the second substitute physical addresses WSUB_PA2, the third substitute physical addresses WSUB_PA3, and the fourth substitute physical addresses WSUB_PA4 in the bad information loading element 940.

When the value of a first physical address PA1 represents one bad block among the bad blocks that are included in the first memory blocks, the bad block controller 900 may allow one substitute memory block among the substitute memory blocks that are included in the first memory blocks to be used, or allow one substitute memory block among the substitute memory blocks that are included in the second memory blocks to be used, or allow one substitute memory block among the substitute memory blocks that are included in the third memory blocks to be used, or allow one substitute memory block among the substitute memory blocks that are included in the fourth memory blocks to be used. Likewise, when the value of a second is physical address PA2 represents one bad block among the bad blocks that are included in the second memory blocks, the bad block controller 900 may allow one substitute memory block among the substitute memory blocks that are included in the first memory blocks to be used, or allow one substitute memory block among the substitute memory blocks that are included in the second memory blocks to be used, or allow one substitute memory block among the substitute memory blocks that are included in the third memory blocks to be used, or allow one substitute memory block among the substitute memory blocks that are included in the fourth memory blocks to be used.

Likewise, when the value of a third physical address PA3 represents one bad block among the bad blocks that are included in the third memory blocks, the bad block controller 900 may allow one substitute memory block among the substitute memory blocks that are included in the first memory blocks to be used, or allow one substitute memory block among the substitute memory blocks that are included in the second memory blocks to be used, or allow one substitute memory block among the substitute memory blocks that are included in the third memory blocks to be used, or allow one substitute memory block among the substitute memory blocks that are included in the fourth memory blocks to be used.

Likewise, when the value of a fourth physical address PA4 represents one bad block among the bad blocks that are included in the third memory blocks, the bad block controller 900 may allow one substitute memory block among the substitute memory blocks that are included in the first memory blocks to be used, or allow one substitute memory block among the substitute memory blocks that are included in the second memory blocks to be used, or allow one substitute memory block among the substitute memory blocks that are included in the third memory blocks to be used, or allow one substitute memory block among the substitute memory blocks that are included in the fourth memory blocks to be used.

To sum up, it may be seen that the operation of the above-described bad block controller 900 is similar to the operation of the bad block controller 500 which is described with reference to FIG. 6. In short, the bad block controller 500, which is described with reference to FIG. 6, has a structure of integrating and managing the bad memory blocks that are included in the first and second memory devices NAND1<1:4> and NAND2<1:4> that are coupled to different channels CH1 and CH2. Herein, it may be seen that the structure of the bad block controller 500 of FIG. 6 is similar to the structure of the bad block controller 900 described with reference to FIG. 10 that the bad memory blocks included in the first to fourth memory devices NAND1<1:4> to NAND4<1:4> which are coupled to different channels CH1 and CH2 and different ways WAY1, WAY2, WAY3 and WAY4 are integrated and managed together.

As described above, in accordance with the third embodiment of the present invention, management for the bad memory blocks included in the memory devices which are coupled to different ways may be integrated in the memory system including a plurality of memory devices that are coupled to different ways.

FIGS. 11 to 19 are diagrams schematically illustrating application examples of the data processing system of FIG. 1.

Figure 11:
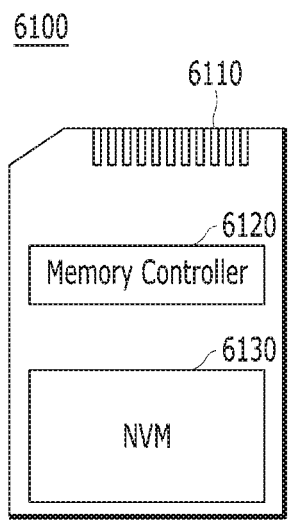
FIGS. 11 to 19 are diagrams schematically illustrating application examples of the data processing system of FIG. 1.

FIG. 11 is a diagram schematically illustrating another example of the data processing system including the memory system in accordance with the present embodiment. FIG. 11 schematically illustrates a memory card system to which the memory system in accordance with the present embodiment is applied.

Referring to FIG. 11, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 10, and the memory device 6130 may correspond to the memory device 150 of the memory system 110 described with reference to FIGS. 1 to 10.

Thus, the memory controller 6120 may include a RAM, a processing unit, a host interface, a memory interface and an error correction unit. The memory controller 130 may further include the elements shown in FIG. 5, 7 or 9.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5, 7 or 9.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 12:
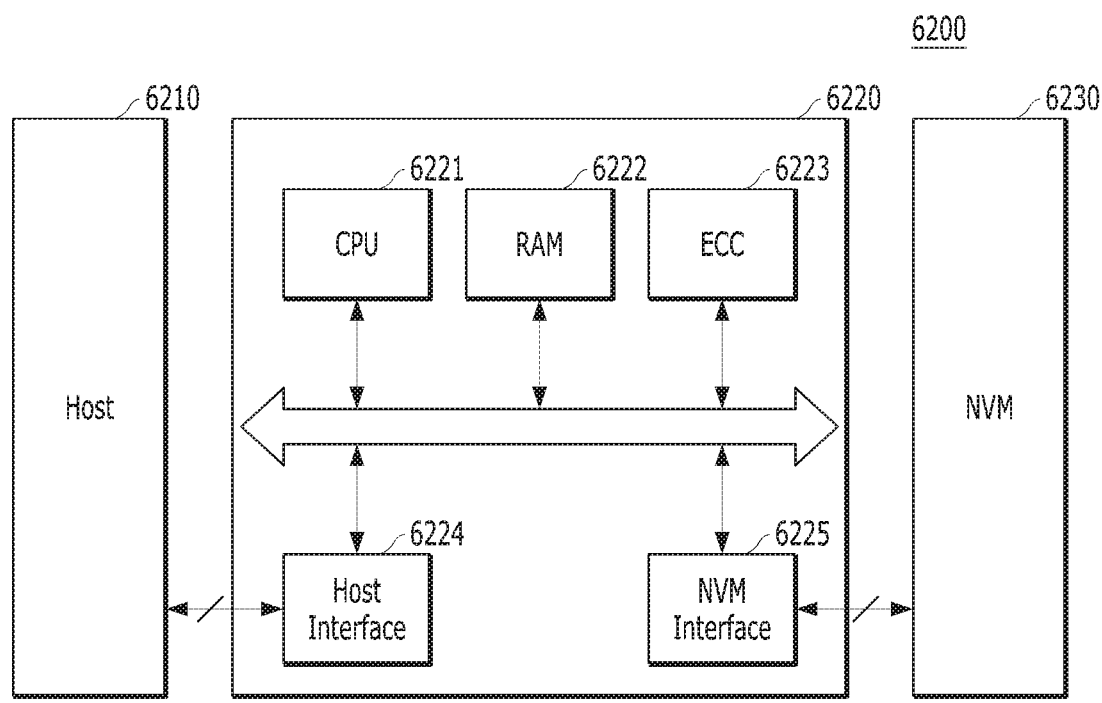

FIG. 12 is a diagram schematically illustrating another example of the data processing system including the memory system in accordance with the present embodiment.

Referring to FIG. 12, the data processing system 6200 may include a memory device 6230 having one or more nonvolatile memories and a memory controller 6220 for controlling the memory device 6230. The data processing system 6200 illustrated in FIG. 12 may serve as a storage medium such as a memory card (CF, SD, is micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NUM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a TATA bus, SATA bus, SCSI, USB, PCIe or NAND interface. The memory controller 6220 may have a wireless communication function with a mobile communication protocol such as WiFi or Long Term Evolution (LTE), The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 13:
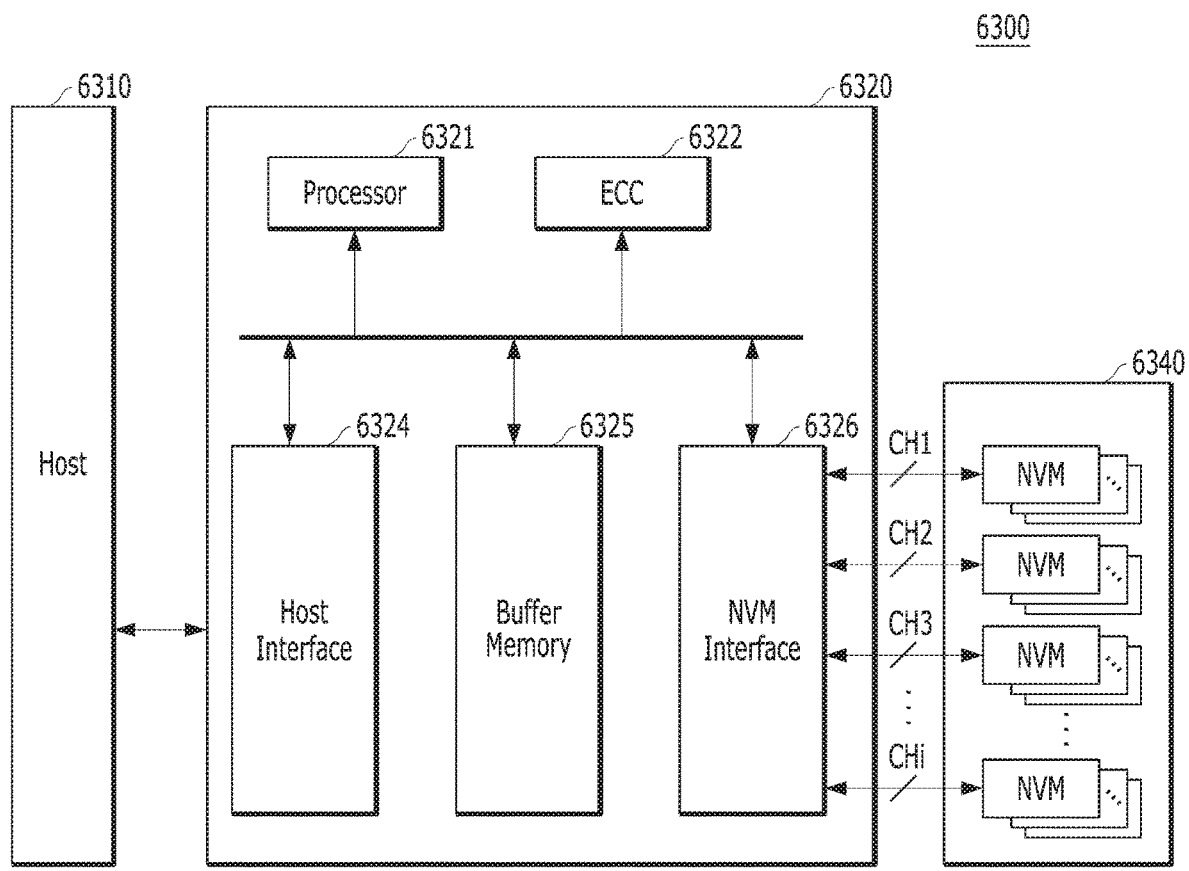

FIG. 13 is a diagram schematically illustrating another example of the data processing system including the memory system in accordance with the present embodiment. FIG. 13 schematically illustrates an SSD to which the memory system in accordance with the present embodiment is applied.

Referring to FIG. 13, the SSD 6300 may include a controller 6320 and a memory device 6340 including a plurality of nonvolatile memories. The controller 6320 may correspond to the controller 130 in the memory system 110 of FIGS. 1 to 10, and the memory device 6340 may correspond to the memory device 150 in the memory system of FIGS. 1 to 10.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 12 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 10 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
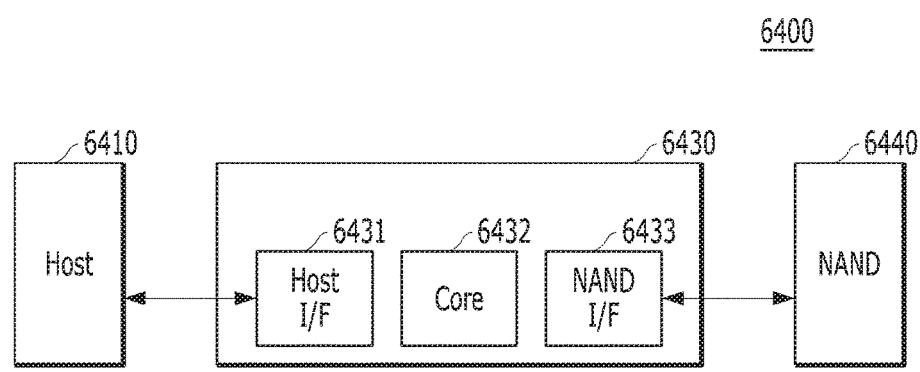

FIG. 14 is a diagram schematically illustrating another example of the data processing system including the memory system in accordance with the present embodiment. FIG. 14 schematically illustrates an embedded Multi-Media Card (eMMC) to which the memory system in accordance with the present embodiment is applied.

Referring to FIG. 14, the eMMC 6400 may include a controller 6430 and a memory device 6440 embodied by one or more NAND flash memories. The controller 6430 may correspond to the controller 130 in the memory system 110 of FIGS. 1 to 10 5, and the memory device 6440 may correspond to the memory device 150 in the memory system 110 of FIGS. 1 to 10.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in accordance with the present embodiment. FIGS. 15 to 18 schematically illustrate UFS (Universal Flash Storage) systems to which the memory system in accordance with the present embodiment is applied.

Referring to FIGS. 15 to 18, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 to 10. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 12 to 14, and the UFS cards 6530, 6630, 6730 and 6830 may be embodied in the form of the memory card system 6100 described with reference to FIG. 11.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 15:
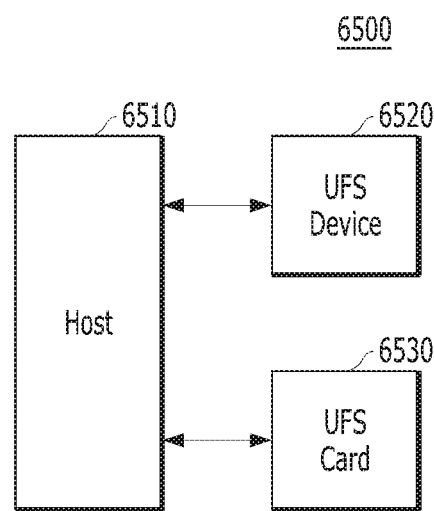

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 16:
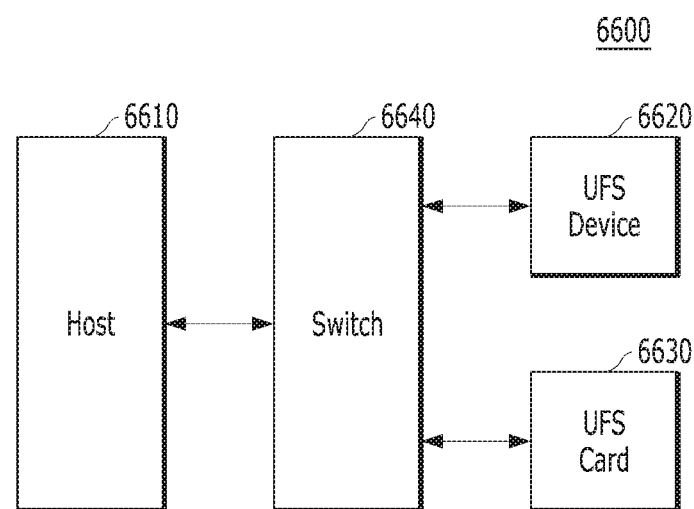

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 17:
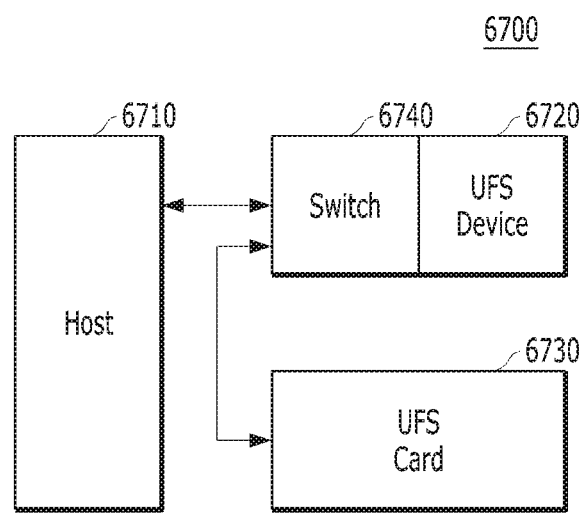

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
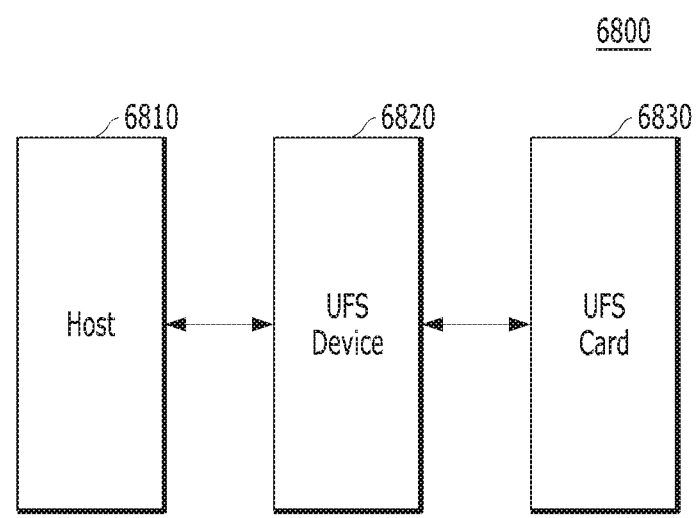

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
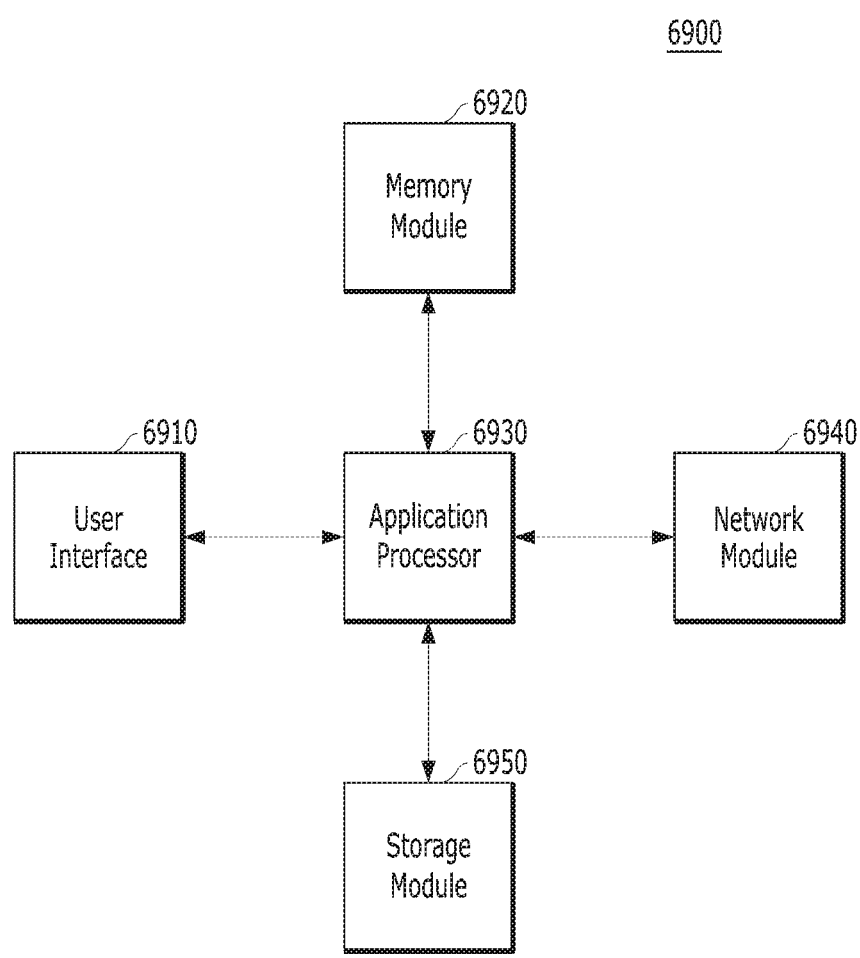

FIG. 19 is a diagram schematically illustrating another example of the data processing system including the memory system in accordance with an embodiment. FIG. 19 is a diagram schematically illustrating a user system to which the memory system in accordance with the present embodiment is applied.

Referring to FIG. 19, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (W max), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 10. Furthermore, the storage module 6950 may be embodied as an SSD, eMMC and UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 to 10 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiment of the present invention, a memory system including a plurality of memory devices that are coupled to different channels or different ways, and even though the memory devices are coupled to different channels or different ways, bad memory blocks of the memory devices may be managed in an integrated method. Therefore, the bad memory blocks may be managed efficiently.

While the present invention has been described with respect to specific embodiments, it will be apparent to those skilled in the art that various changes and modifications may be made without departing from the spirit and scope of the invention as defined in the following claims.

What is claimed is:
1. A memory system, comprising:
 a plurality of first memory devices each coupled to a first channel and including a plurality of first memory blocks;

a plurality of second memory devices each coupled to a second channel and including a plurality of second memory blocks;

a first access controller suitable for controlling an access to the first memory blocks;

a second access controller suitable for controlling an access to the second memory blocks;

a first bad block table including mapping relation information between partial entries of bad physical addresses corresponding to bad blocks included in each of the first and second memory devices with first substitute physical addresses corresponding to the first memory blocks;

a second bad block table including mapping relation information between remaining partial entries of the bad physical addresses with second substitute physical addresses corresponding to the second memory blocks;

a path control element suitable for:

selecting the first access controller and transferring the first substitute physical addresses when first and second physical addresses respectively corresponding to the first and second memory blocks are identical to the partial entries of the bad physical addresses, selecting the second access controller and transferring the second substitute physical addresses when the first and second physical addresses are identical to the remaining partial entries of the bad physical addresses, and selecting the first access controller and transferring the first physical addresses or selecting the second access controller and transferring the second physical addresses when the first and second physical addresses are not identical to the bad physical addresses corresponding to bad blocks included in each of the first and second memory devices; and a bad information loading element suitable for:

loading information of the bad physical addresses and substitute physical address that replace the bad physical addresses from the first and second memory devices, deciding which substitute physical addresses are to be mapped to the bad physical addresses based on the number of the loaded bad physical addresses, and generating the first and second bad block tables.

2. The memory system of claim 1, wherein the path control element includes:

a first specific path control element suitable for:

selecting the first access controller and transferring the first substitute physical addresses when the first physical address is identical to the partial entries of the bad physical addresses, selecting the second access controller and transferring the second substitute physical addresses when the first physical address is identical to the remaining partial entries of the bad physical addresses, and selecting the first access controller and transferring the first physical addresses when the first physical addresses is not identical to the bad physical addresses; and a second specific path control element suitable for:

selecting the second access controller and transferring the second substitute physical addresses when the second physical address is identical to the remaining partial entries of the bad physical addresses, selecting the first access controller and transferring the first substitute physical addresses when the second physical address is identical to the partial entries of the bad physical addresses, and selecting the second access controller and transferring the second physical addresses when the second physical addresses is not identical to the bad physical addresses.

3. The memory system of claim 1, wherein the bad information loading element generates the first and second bad block tables by checking out the total number of the bad physical addresses that are stored in the first and second memory devices, and distributes the bad physical addresses in such a manner that the number of the partial entries of the bad physical addresses and the number of the remaining partial entries of the bad physical addresses do not exceed a predetermined number of difference.

* * * * *